(12) United States Patent
Robbins et al.

(10) Patent No.: US 9,915,825 B2
(45) Date of Patent: Mar. 13, 2018

(54) WAVEGUIDES WITH EMBEDDED COMPONENTS TO IMPROVE INTENSITY DISTRIBUTIONS

(71) Applicant: Microsoft Technology Licensing, LLC, Redmond, WA (US)

(72) Inventors: Steven John Robbins, Redmond, WA (US); Scott Woltman, Lynnwood, WA (US); R. Andrew Wall, Kirkland, WA (US); Yarn Chee Poon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

(21) Appl. No.: 14/936,985

(22) Filed: Nov. 10, 2015

(65) Prior Publication Data
US 2017/0131551 A1 May 11, 2017

(51) Int. Cl.
*G02B 27/00* (2006.01)
*G02B 27/01* (2006.01)
(Continued)

(52) U.S. Cl.
CPC ....... *G02B 27/0172* (2013.01); *G02B 5/1828* (2013.01); *G02B 6/0016* (2013.01);
(Continued)

(58) Field of Classification Search
CPC ... G02B 27/0081; G02B 27/017; G02B 27/01
See application file for complete search history.

(56) References Cited

U.S. PATENT DOCUMENTS

| 5,724,463 A | 3/1998 | Deacon et al. |
| 6,392,338 B1 | 5/2002 | Hori et al. |
| (Continued) | | |

FOREIGN PATENT DOCUMENTS

| CN | 102768440 A | 11/2012 |
| CN | 202904057 U | 4/2013 |
| (Continued) | | |

OTHER PUBLICATIONS

International Search Report and Written Opinion issued Mar. 30, 2017,in PCT Application No. PCT/US2016/060216, 22 Pages.
(Continued)

*Primary Examiner* — Jessica M Merlin
(74) *Attorney, Agent, or Firm* — Arent Fox LLP

(57) ABSTRACT

An apparatus for use in replicating an image associated with an input-pupil to an output-pupil includes a planar optical waveguide including a bulk-substrate, and also including an input-coupler, an intermediate-component and an output-coupler. The input-coupler couples light corresponding to the image into the bulk-substrate and towards the intermediate-component. The intermediate-component performs horizontal or vertical pupil expansion and directs the light corresponding to the image towards the output-coupler. The output-coupler performs the other one of horizontal or vertical pupil expansion and couples light corresponding to the image, which travels from the input-coupler to the output-coupler, out of the waveguide. The apparatus further includes a volume layer, embedded between first and second major planar surfaces of the bulk-substrate, configured to cause light that is output by the output-coupler to have a more uniform intensity distribution compared to if the volume layer were absent.

13 Claims, 8 Drawing Sheets

(51) Int. Cl.
*G02B 5/18* (2006.01)
*F21V 8/00* (2006.01)
*G02B 6/34* (2006.01)
*G02F 1/1343* (2006.01)
*G02F 1/137* (2006.01)

(52) U.S. Cl.
CPC ............ *G02B 6/0035* (2013.01); *G02B 6/34* (2013.01); *G02B 27/0081* (2013.01); *G02F 1/137* (2013.01); *G02F 1/13439* (2013.01); *G02F 1/134336* (2013.01); *G02B 2027/0105* (2013.01); *G02B 2027/0118* (2013.01); *G02B 2027/0123* (2013.01); *G02B 2027/0125* (2013.01)

(56) References Cited

U.S. PATENT DOCUMENTS

| | | |
|---|---|---|
| 6,693,749 B2 | 2/2004 | King et al. |
| 6,999,156 B2 | 2/2006 | Chou et al. |
| 7,027,671 B2 | 4/2006 | Huck et al. |
| 7,075,615 B2 | 7/2006 | Ishihara et al. |
| 7,206,107 B2 | 4/2007 | Levola |
| 7,307,786 B2 | 12/2007 | Hatjasalo et al. |
| 7,692,759 B2 | 4/2010 | Escuti et al. |
| 7,704,682 B2 | 4/2010 | Cho et al. |
| 8,203,691 B2 | 6/2012 | Yuan et al. |
| 8,611,014 B2 | 12/2013 | Valera et al. |
| 8,749,890 B1 | 6/2014 | Wood et al. |
| 8,903,207 B1 | 12/2014 | Brown et al. |
| 8,985,803 B2 | 3/2015 | Bohn |
| 9,091,851 B2 | 7/2015 | Border et al. |
| 2001/0024177 A1 | 9/2001 | Popovich |
| 2003/0138209 A1 | 7/2003 | Chan |
| 2004/0240777 A1 | 12/2004 | Woodgate et al. |
| 2007/0071061 A1 | 3/2007 | Pietra et al. |
| 2008/0278812 A1 | 11/2008 | Amitai |
| 2009/0033814 A1* | 2/2009 | Khan ............... G02B 27/48 349/35 |
| 2009/0074356 A1 | 3/2009 | Sanchez et al. |
| 2010/0202725 A1* | 8/2010 | Popovich ........... G02B 27/48 385/10 |
| 2010/0214659 A1 | 8/2010 | Levola |
| 2010/0296163 A1 | 11/2010 | Saarikko |
| 2012/0002256 A1 | 1/2012 | Lacoste et al. |
| 2012/0120493 A1 | 5/2012 | Simmonds et al. |
| 2012/0224062 A1 | 9/2012 | Lacoste et al. |
| 2013/0250431 A1* | 9/2013 | Robbins ........... G02B 27/0172 359/633 |
| 2013/0314793 A1 | 11/2013 | Robbins et al. |
| 2014/0104665 A1 | 4/2014 | Popovich et al. |
| 2014/0140654 A1 | 5/2014 | Brown et al. |
| 2014/0168735 A1 | 6/2014 | Yuan et al. |
| 2014/0300966 A1 | 10/2014 | Travers et al. |
| 2015/0010265 A1 | 1/2015 | Popovich et al. |
| 2015/0016777 A1 | 1/2015 | Abovitz et al. |
| 2015/0125109 A1 | 5/2015 | Robbins et al. |
| 2016/0116739 A1 | 4/2016 | Tekolste et al. |

FOREIGN PATENT DOCUMENTS

| | | |
|---|---|---|
| CN | 103091783 A | 5/2013 |
| EP | 0798573 A1 | 10/1997 |
| EP | 2733517 A1 | 5/2014 |
| GB | 2500631 A | 10/2013 |
| JP | H02287441 A | 11/1990 |
| JP | H07140311 A | 6/1995 |
| JP | 2002319178 A | 10/2002 |
| TW | I247928 B | 1/2006 |
| TW | 201339671 A | 10/2013 |
| WO | 2004109349 A2 | 12/2004 |
| WO | 2006064301 A1 | 6/2006 |
| WO | 2008148927 A1 | 12/2008 |
| WO | 2009013597 A2 | 1/2009 |
| WO | 2013033274 A1 | 3/2013 |
| WO | 2013163347 A1 | 10/2013 |
| WO | 2013167864 A1 | 11/2013 |
| WO | 2014009717 A1 | 1/2014 |
| WO | 2014080155 A1 | 5/2014 |
| WO | 2014081415 A1 | 5/2014 |

OTHER PUBLICATIONS

"The LC Variable Phase Retarder", Published on: May 13, 2007, Available at: http://www.arcoptix.com/variable_phase_retarder.htm.

Liua, et al., "Light controlled friction at a liquid crystal polymer coating with switchable patterning", In Journal of Soft Matter, Issue 40, Oct. 28, 2014, 4 pages.

Oh, et al., "Electrically switchable achromatic liquid crystal polarization gratings on reflective substrates", In Proceedings of the SPIE, vol. 7050, Aug. 2008, 9 pages.

"Waveguide-based Displays Maturing for Augmented Reality Applications", Retrieved on: Aug. 19, 2015, Available at: http://www.displaydaily.com/articles/446-sponsored-articles/14132-waveguide-based-displays-maturing-for-augmented-reality-applications.

Kim, et al., "Alignment Control of Liquid Crystals on Surface Relief Gratings", In Journal of Liquid Crystals, vol. 27, Issue 12, Aug. 6, 2010, 2 pages.

Subacius, et al., "Structured Polymer/Liquid Crystal for Switchable Diffractive and Micro Optics", In Proceedings of SPIE, vol. 3778, Sep. 17, 1999, 10 pages.

Emoto, et al., "Optical and Physical Applications of Photocontrollable Materials: Azobenzene-Containing and Liquid Crystalline Polymers", In Journal of Polymers, vol. 4, Issue 1, Jan. 9, 2012, pp. 150-186.

Ishii, et al., "Surface-relief type Bragg Grating Reflector Fabricated after Overcladding Removal", In Electronics Letters, vol. 29, Issue 19, Sep. 16, 1993, pp. 1684-1685.

Kress, et al., "Diffractive and Holographic Optics as Optical Combiners in Head Mounted Displays", In Proceedings of ACM International Joint Conference on Pervasive and Ubiquitous Computing, Sep. 8, 2013, pp. 1479-1482.

Second Written Opinion dated Aug. 10, 2017, in PCT Application No. PCT/US2016/060216, 7 Pages.

\* cited by examiner

*(top view)*

*(side view)*

WAVEGUIDES WITH EMBEDDED COMPONENTS TO IMPROVE INTENSITY DISTRIBUTIONS

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing waveguides to display images of virtual objects to a user.

SUMMARY

Certain embodiments described herein relate to an apparatus for use in replicating an image associated with an input-pupil to an output-pupil. The apparatus includes a planar optical waveguide including a bulk-substrate, and also includes an input-coupler, an intermediate-component and an output-coupler. The input-coupler couples light corresponding to the image into the bulk-substrate and towards the intermediate-component. The intermediate-component performs horizontal or vertical pupil expansion and directs the light corresponding to the image towards the output-coupler. The output-coupler performs the other one of horizontal or vertical pupil expansion and couples light corresponding to the image, which travels from the input-coupler to the output-coupler, out of the waveguide. In certain embodiments, the intermediate-component can be eliminated, in which case the input-coupler directs light coupled into the bulk-substrate towards the output-coupler. In certain embodiments, the apparatus further includes a volume layer, embedded between opposing major planar surfaces of the bulk-substrate, to cause light that is output by the output-coupler to have a more uniform intensity distribution compared to if the volume layer were absent. The volume layer, in certain embodiments, is a switchable liquid crystal (LC) layer. The volume layer, in other embodiments, includes one or more volume Bragg gratings (VBGs), each of which forms a part of a hybrid grating that includes both a surface relief grating (SRG) and a VBG.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
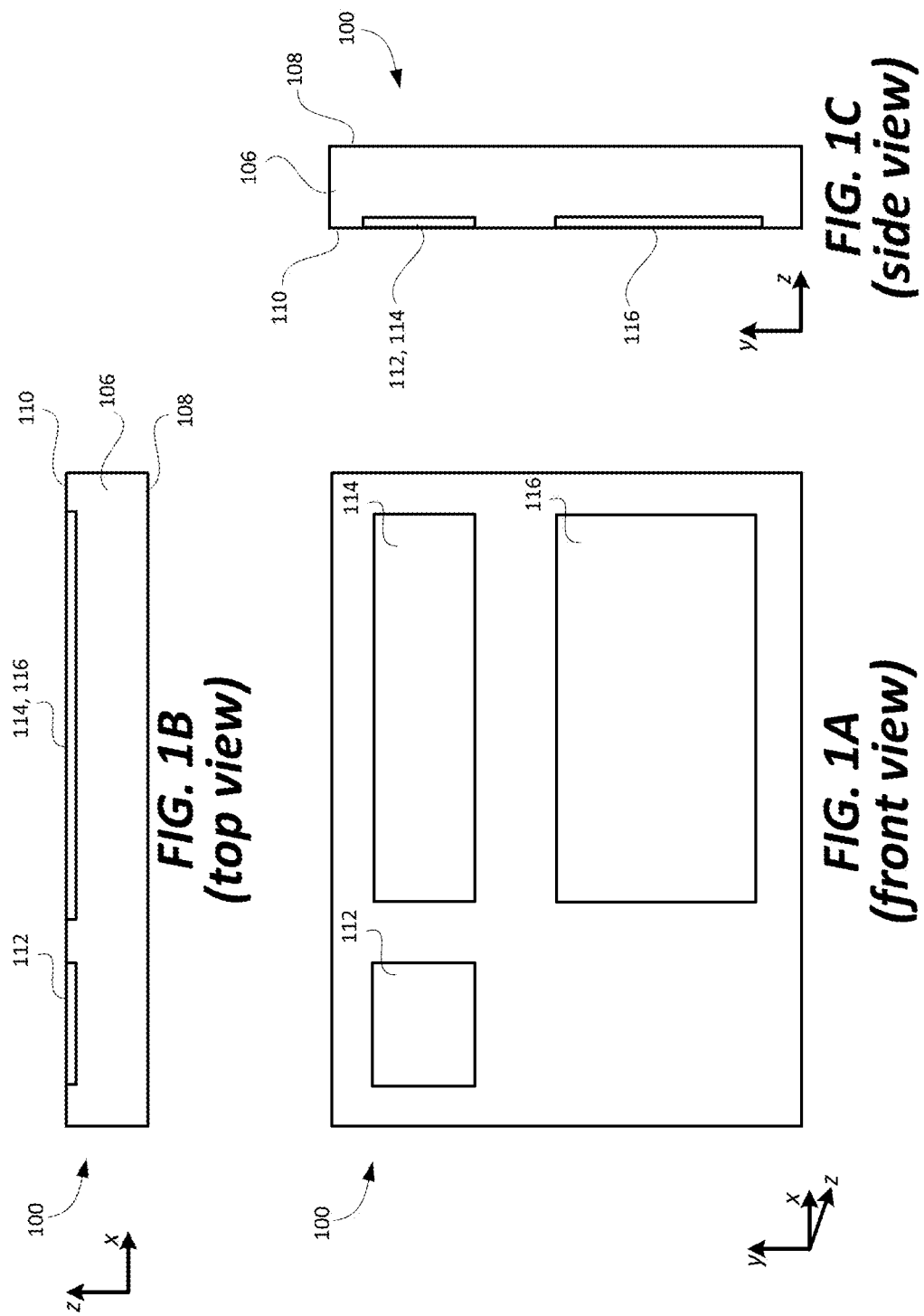
FIGS. 1A, 1B and 1C are front, top and side views, respectively, of an exemplary waveguide that can be used to replicate an image associated with an input-pupil to an expanded output-pupil.

Certain embodiments of the present technology relate to apparatuses for use in replicating an image associated with an input-pupil to an output-pupil. Such apparatuses can include a waveguide. As will be discussed in further details below, where waveguides are used to perform pupil replication (also referred to as image replication), non-uniformities in local and global intensities may occur, which may result in dark and light fringes and dark blotches when the replicated image is viewed, which is undesirable. Certain embodiments described herein can be used to improve intensity distributions, and thereby, can be used to improve the replicated image when viewed.

In the description that follows, like numerals or reference designators will be used to refer to like parts or elements throughout. In addition, the first digit of a three digit reference number, or the first two digits of a four digit reference number, identifies the drawing in which the reference number first appears.

FIGS. 1A, 1B and 1C are front, top and side views, respectively, of exemplary planar optical waveguide 100 that can be used to replicate an image associated with an input-pupil to an expanded output-pupil. The term "input pupil," as used herein, refers to an aperture through which light corresponding to an image is overlaid on an input-coupler of a waveguide. The term "output pupil," as used herein, refers to an aperture through which light corresponding to an image exits an output-coupler of a waveguide. The planar optical waveguide 100 will often be referred to hereafter more succinctly simply as an optical waveguide 100, or even more succinctly as a waveguide 100. As will be discussed in further detail below with reference to FIG. 2, the image that the waveguide 100 is being used to replicate, and likely also expand, can be generated using a display engine.

Referring to FIGS. 1A, 1B and 1C, the planar optical waveguide 100 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the planar optical waveguide 100 from the input-coupler 112 to the output-coupler 116, out of the waveguide 100 so that the light is output and imaged from the output-pupil.

The bulk-substrate 106, which can be made of glass or optical plastic, but is not limited thereto, includes a first major planar surface 108 and a second major planar surface 110 opposite and parallel to the first major planar surface 108. The first major planar surface 108 can alternatively be referred to as the front-side major surface 108 (or more simply the front-side surface 108), and the second major planar surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 μm. In accordance with certain embodiments, the bulk-substrate 106 has a thickness of at least 25 μm between its major planar surfaces 108 and 110. In specific embodiments, the bulk-substrate 106 has a thickness (between its major surfaces) within a range of 25 μm to 1000 μm. The bulk-substrate 106, and more generally the waveguide 100, is transparent, meaning that it allows light to pass through it so that a user can see through the waveguide 100 and observe objects on an opposite side of the waveguide 100 than the user's eye(s).

The planar optical waveguide 100 in FIGS. 1A, 1B and 1C is also shown as including an intermediate-component 114, which can alternatively be referred to as an intermediate-zone 114. Where the waveguide 100 includes the intermediate-component 114, the input-coupler 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion. In certain embodiments, the intermediate-component is configured as a fold-grating. In other embodiments, the intermediate-component is a mirror based component, rather than a grating based component.

The input-coupler 112, the intermediate-component 114 and the output-coupler 116 can be referred to collectively herein as optical components 112, 114 and 116 of the waveguide, or more succinctly as components 112, 114 and 116.

It is possible that a waveguide includes an input-coupler and an output-coupler, without including an intermediate-components. In such embodiments, the input-coupler would be configured to couple light into the waveguide and in a direction toward the output-coupler. In such embodiments, the output-coupler can provide one of horizontal or vertical pupil expansion, depending upon implementation.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 1C, the input-coupler 112, the intermediate-component 114 and the output-coupler 116 are all shown as being provided in or on a same surface (i.e., the back-side surface 110) of the waveguide 100. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side surface 110 of the waveguide 100. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major surfaces 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side surface 108 of the waveguide 108, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major planar surfaces 108 or 110 of the bulk-substrate 106, or embedded therebetween.

The input-coupler 112, the intermediate-component 114 and the output-coupler 116 can each be implemented as a diffraction grating, or more generally, as a diffractive optical element (DOE). Such DOEs can be produced using holographic processes, in which case the DOEs can be more specifically referred to a holographic optical elements (HOEs). The input-coupler 112 can alternatively be implemented as a prism, a reflective polarizer or can be mirror based. Similarly, the output-coupler 116 can alternatively be implemented as a prism, a reflective polarizer or can be mirror based. Depending upon the specific configuration and implementation, any one of the input-coupler 112, the intermediate-component 114 and the output-coupler 116 can be reflective, diffractive or refractive, or a combination thereof, and can be implemented, e.g., as a linear grating type of coupler, a holographic grating type of coupler, a prism or another type of optical coupler. The intermediate-component 114, as noted above, can be implemented using a fold-grating, or can alternatively be implemented as a mirror based pupil expander, but is not limited thereto.

Where the input-coupler 112, the intermediate-component 114 and the output-coupler 116 are implemented in or on one (or both) of the surfaces 108 and/or 110 of the waveguide 100, one or more of them can be implemented as a surface grating, or more specifically, as a surface relief grating (SRG). A surface grating is a periodic structure in or on the surface of an optical component, such as a bulk-substrate 106. When the periodic structure is due to modulation of the surface itself, or a coating on the surface, it is referred to as a surface relief grating (SRG). An exemplary SRG includes uniform straight grooves in or on a surface of an optical component that are separated by uniform straight groove spacing regions. The nature of the diffraction by an SRG depends both on the wavelength of light incident on the grating and various optical characteristics of the SRG, such as line spacing, groove depth and groove slant angle. An SRG can be fabricated by way of a suitable microfabrication process, which may involve etching of and/or deposition on a substrate (e.g., the bulk-substrate 106) to fabricate a desired periodic microstructure in or on the substrate to form an optical component, which may then be used as a production master such as a mold or mask for manufacturing further optical components. An SRG is an example of a Diffractive Optical Element (DOE).

Where the input-coupler 112, the intermediate-component 114 and/or the output-coupler 116 is an SRG, each such SRG can be etched into one of the major planar surfaces 108 or 110 of the bulk-substrate 106. In such embodiments, the SRG can be said to be formed "in" the bulk-substrate 106. Alternatively, each SRG can be physically formed in an isotropic coating that covers one of the major planar surfaces 108 or 110 of the bulk-substrate 106, in which case each such SRG can be said to be formed "on" the bulk-substrate 106. Either way, the components 112, 114 and 116 are considered parts of the waveguide 100. In certain embodiments where the SRG(s) are formed in an isotropic coating, which covers one of the major planar surfaces 108 or 110 of the bulk-substrate 106, the isotropic coating in which the SRG(s) is/are formed has a same index of refraction as the bulk-substrate 106. As will be discussed in further details below, with reference to FIG. 7, in accordance with specific embodiments of the present technology, one or more SRG(s) can be formed in an anisotropic coating, or more specifically, in a liquid crystal polymer (LCP) coating, in which case the SRG(s) can be considered LCP based SRG(s).

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible and within the scope of embodiments of the present technology.

More generally, the input-coupler 112, the intermediate-component 114 and the output-coupler 116 can have various different outer peripheral geometries, can be provided in or on either of the major planar surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 114, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

Figure 2:
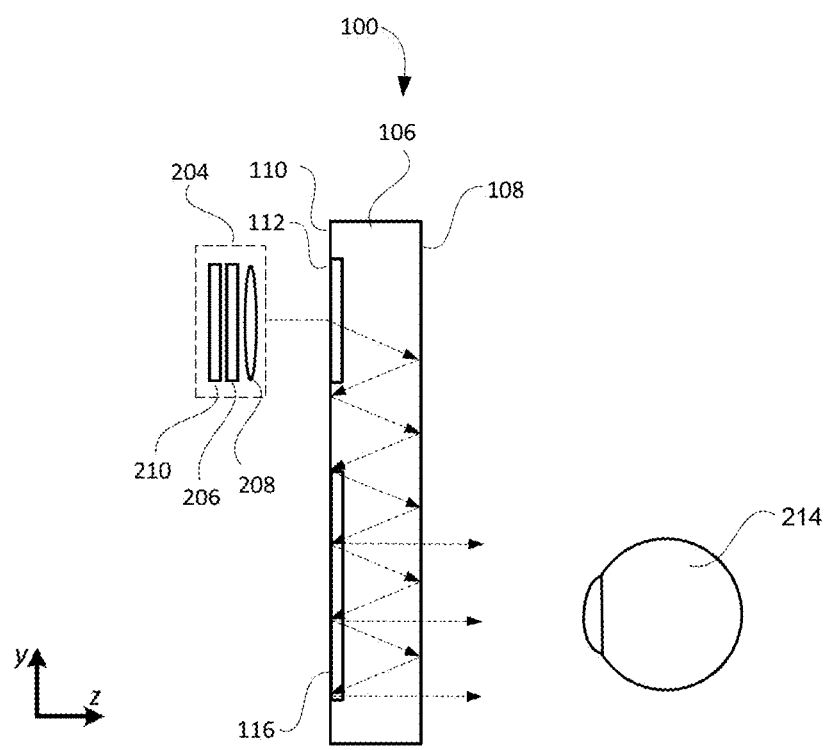
FIG. 2 is side view of the exemplary waveguide introduced with reference to FIGS. 1A, 1B and 1C, and also shows a display engine that generates an image including angular content that is coupled into the waveguide by an input-coupler, and also shows an eye that is viewing the image within an eye box that is proximate the output-coupler.

The concept of light traveling through the waveguide 100, from the input-coupler 112 to the output-coupler 114, by way of TIR, can be better appreciated from FIG. 2, which is discussed below. Referring now to FIG. 2, as in FIG. 1C, FIG. 2 shows a side view of the waveguide 100, but also shows a display engine 204 that generates an image including angular content that is coupled into the waveguide by the input-coupler 112. Also shown in FIG. 2, is representation of a human eye 214 that is using the waveguide 100 to observe an image, produced using the display engine 204, as a virtual image.

The display engine 204 can include, e.g., an image former 206, a collimating lens 208 and an illuminator 210, but is not limited thereto. The image former 206 can be implemented using a transmissive projection technology where a light source is modulated by an optically active material, and backlit with white light. These technologies are usually implemented using liquid crystal display (LCD) type displays with powerful backlights and high optical energy densities. The illuminator 210 can provide the aforementioned backlighting. The image former 206 can also be implemented using a reflective technology for which external light is reflected and modulated by an optically active material. Digital light processing (DLP), liquid crystal on silicon (LCOS) and Mirasol® display technology from Qualcomm, Inc. are all examples of reflective technologies. Alternatively, the image former 206 can be implemented using an emissive technology where light is generated by a display, see for example, a PicoP™ display engine from Microvision, Inc. Another example of emissive display technology is a micro organic light emitting diode (OLED) display. Companies such as eMagin and Microoled provide examples of micro OLED displays. The image former 206, alone or in combination with the illuminator 210, can also be referred to as a micro display. The collimating lens 208 is arranged to receive a diverging display image from the image former 206, to collimate the display image, and to direct the collimated image toward the input-coupler 112 of the waveguide 100. In accordance with an embodiment, an entry pupil associated with the waveguide may be approximately the same size as an exit pupil associated with the image former 206, e.g., 5 mm or less in some embodiments, but is not limited thereto.

In FIG. 2, the display engine 204 is shown as facing the back-side surface 110 of the waveguide 100, and the eye 214 is shown as facing the front-side surface 108 opposite and parallel to the back-side surface 110. This provides for a periscope type of configuration in which light enters the waveguide on one side of the waveguide 100, and exits the waveguide at an opposite side of the waveguide 100. Alternatively, the input-coupler 112 and the output-coupler 116 can be implemented in a manner such that the display engine 204 and the eye 214 are proximate to and face a same major planar surface (108 or 110).

The waveguide 100 can be incorporated into a see-through mixed reality display device system, but is not limited to use therewith. A separate instance of the waveguide 100 and the display engine 204 can be provided for each of the left and right eyes of a user. In certain embodiments, such waveguide(s) 100 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art.

Figure 3:
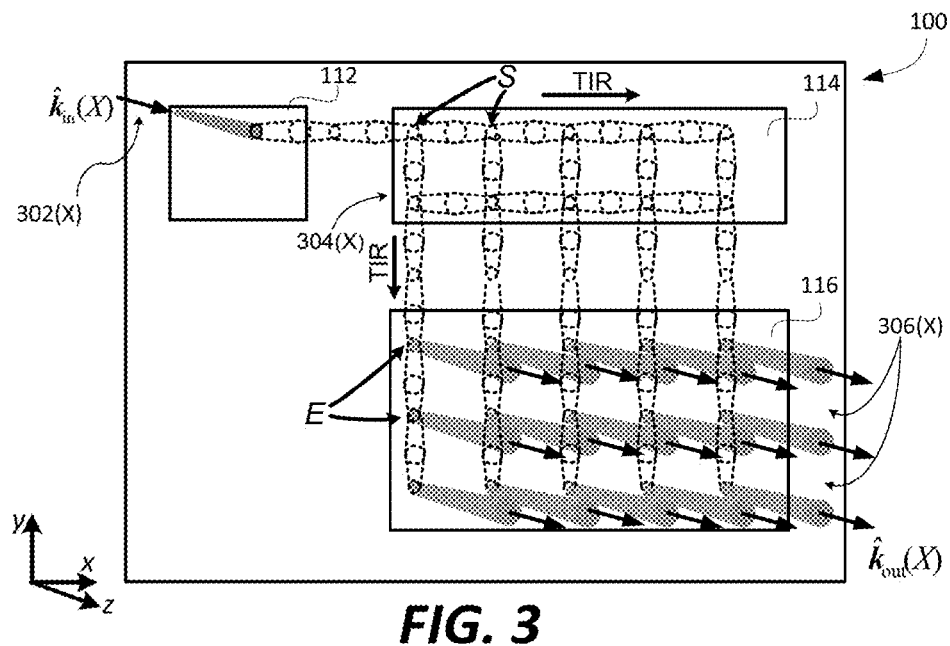
FIG. 3, which is similar to FIG. 1A because it provides a front view of the waveguide, is used to explain how light that is coupled into the waveguide by an input-coupler, travels by way of total internal reflection (TIR) from the input-coupler to an intermediate-component, and by way of TIR from the intermediate-component to an output-coupler, where it exits the waveguide.

FIG. 3, which is similar to FIG. 1A in that it provides a front view of the waveguide 100, will now be used to explain how light that is coupled into the waveguide 100 by the input-coupler 112, can travel by way of TIR from the input-coupler 112 to the intermediate-component 114, and by way of TIR from the intermediate-component 114 to the output-coupler 116, where it exits the waveguide 100. More specifically, as explained in more detail below, a combination of diffractive beam splitting and TIR within the waveguide 100 results in multiple versions of an input beam of light 302(X) being outwardly diffracted from the output-coupler 116 in both the length and the width of the output-coupler 116 as output beams 306(X) in respective outward directions (that is, away from the waveguide 100) that substantially match the respective inward direction $\hat{k}_{in}(X)$ of the corresponding input beam 302(X).

In FIG. 3, beams external to (e.g., entering or exiting) the waveguide 100 are represented using shading and dotted lines are used to represent beams within (i.e., internal to) the waveguide 100. Perspective is used to indicate propagation in the z-direction (i.e., towards or way from a user), with widening of the beams in FIG. 3 representing propagation in the positive z (i.e., +z) direction (that is towards the user). Thus, diverging dotted lines represent beams within the waveguide propagating towards the front-side major surface 108 of the waveguide 100, with the widest parts (shown as large dotted circles) represent those beams striking the front-side major surface 108 of the waveguide 100, from which they are totally internally reflected back towards the back-side major surface 110 of the waveguide 100, which is represented by the dotted lines converging from the widest points to the narrowest points (shown as the small dotted circles) at which they are incident on the back-side major surface 110 of the waveguide 100.

Exemplary regions where a beam is incident on the intermediate-component 114 and splits into two beams, one of which travels in the horizontal direction and the other one of which travels in the vertical direction, are labeled S (for split or splitting). Exemplary regions where a beam is incident on the output-coupler 116 and exits the waveguide 100 are labeled E (for exit or exiting).

As illustrated, the input beam 302(X) is coupled into the waveguide 100, e.g., by way of diffraction, by the input-coupler 112, and propagates along a width of the input-coupler by way of TIR in the horizontal direction. This results in the beam 302(X) eventually striking the intermediate-component 114 at a left-most splitting region (S). When the beam 302(X) is incident at the left-most splitting region (S), that incident beam 302(X) is effectively split in two, e.g., by way of diffraction. This splitting creates a new version of that beam 304(X) (specifically a first-order diffraction mode beam) which is directed in a generally downwards vertical (−y) direction towards the output-coupler 116, in addition to a zero-order diffraction mode beam (i.e. unaffected by the diffractive component) that continues to propagate along the width of the intermediate-component 114 in the horizontal (+x) direction, just as the beam would in the absence of the intermediate-component 114 (albeit at a reduced intensity). Thus, a portion of the beam effectively continues to propagate along substantially the whole width of the intermediate-component 114, striking the intermediate-component 114 at various splitting regions (S), with another new version of the beam (in the same downward direction) created at each splitting region (S). As shown in FIG. 3, this results in multiple versions of the beam being directed toward, and incident on, the output-coupler 116, with the multiple versions of the beam being horizontally separated so as to collectively span substantially the width of the output-coupler 116.

As also shown in FIG. 3, each new version of the beam as created at a splitting region (S) may itself strike the intermediate-component 114 (e.g., a fold grating) during its downward propagation. This can result in a splitting of the new version of the beam, e.g., by way of diffraction, to create a further new version of that beam that is directed in a horizontal (+x) direction (which is a first-order reflection mode beam), in addition to a zero-order diffraction mode beam that continues to propagate in the downward vertical (−y) direction. This phenomenon may repeat numerous times within the waveguide, as can be appreciated from FIG. 3. FIG. 3 is not drawn to scale, as many more reflections and splitting of beams are likely to occur than illustrated in FIG. 3, e.g., as can be better appreciated from FIG. 4.

In FIG. 3, the output-coupler 116 is shown as being located below the intermediate-component 114, and thus, the downward-propagating versions of the beams will eventually be incident on the output-coupler 116, at which they are guided onto the various exit regions (E) associated with the output-coupler 116. The output-coupler 116 is configured so that when a version of the beam strikes the output-coupler, that beam is diffracted to create a first-order diffraction mode beam directed outwardly from the output-coupler 116, in an outward direction that substantially matches the unique inward direction in which the original beam 302(X) corresponding to an image point X was input. Because there are multiple versions of the beam propagating downwards that substantially span the width of the output-coupler 116, multiple output beams 306(X) are generated across the width of the output-coupler 116 (as shown in FIG. 3) to provide effective horizontal beam expansion, which can also be referred to as horizontal pupil expansion.

Moreover, the output-coupler 116 is configured so that, in addition to the outwardly diffracted beams 306(X) being created at the various exit regions (E) from an incident beam, a zero-order diffraction mode beam continues to propagate downwards in the same specific direction as that incident beam. This, in turn, strikes the output-coupler 116 at lower portions thereof in the manner illustrated in FIG. 3, resulting in both continuing zero-order and outward first-order beams. Thus, multiple output beams 306(X) are also generated across substantially the entire height of the output-coupler 116 to provide effective vertical beam expansion, which can also be referred to as vertical pupil expansion.

The output beams 306(X) are directed outwardly in outward directions that substantially match the unique input direction in which the original beam 302(X) is inputted. In this context, substantially matching means that the outward direction is related to the input direction in a manner that enables a user's eye to focus any combination of the output beams 306(X) to a single point on the retina, thus reconstructing the image point X from which the original beam 302(x) propagated or was otherwise emitted.

For a planar waveguide (i.e., a waveguide whose front-side and back-side major surfaces lie substantially parallel to the xy-plane in their entirety), the output beams 306(S) are substantially parallel to one another and propagate outwardly in an output propagation direction $\hat{k}_{out}(X)$ that is parallel to the unique inward direction $\hat{k}_{in}(X)$ in which the corresponding input beam 302(X) was directed to the input-coupler 112. That is, directing the beam 302(X) corresponding to the image point X to the input-coupler 112 in the inward direction $\hat{k}_{in}(X)$ causes corresponding output beams 306(X) to be directed (e.g., diffracted) outwardly and in parallel from the output-coupler 116, each in an outward propagation direction $\hat{k}_{out}(X)=\hat{k}_{in}(X)$ due to the configuration of the waveguide 100.

In the exemplary implementation described above, the intermediate-component 114 (e.g., a fold grating) is configured to provide horizontal pupil expansion, also referred to as effective horizontal beam expansion; and the output-coupler 116 is configured to provide vertical pupil expansion, also referred to as effective vertical beam expansion. Alternatively, the intermediate-component 114 can be repositioned, e.g., below the input-coupler 112 and to the side of the output-coupler 116, and the components 112, 114 and 116 can be reconfigured such that the intermediate-component 114 is configured to provide vertical pupil expansion, and the output-coupler 116 is configured to provide horizontal pupil expansion, as was noted above. While there are significant benefits to performing horizontal (or vertical) pupil expansion using the intermediate-component 114, the various zero-order and first-order diffraction modes caused by the intermediate-component 114 result in multiple-loop interference, which is explained below with reference to FIG. 4.

Figure 4:
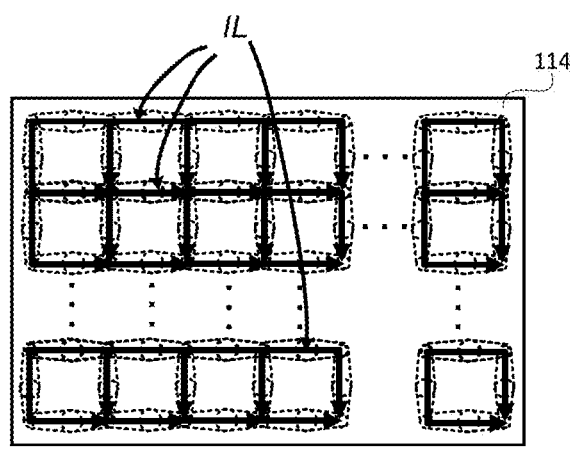
FIG. 4 conceptually illustrates how the intermediate-component of the exemplary waveguide, introduced in the earlier FIGS., can cause multiple-loop interference.

FIG. 4 is illustrative of the intermediate-component 114 of the waveguide 100, but does not show other components of the waveguide, such as the input-coupler 112 and the output-coupler 116. Referring to FIG. 4, the dark lined loops shown therein, which are labeled IL, are illustrative of multiple interference loops that occur within the intermediate-component 114, which can collectively be referred to as multiple-loop interference. Each of the multiple interference loops is analogous to the type of interference that occurs using a Mach-Zehnder interferometer. In each interference loop IL, the positions where two arrow heads meet are illustrative of positions where zero-order and first-order reflections of an input beam (e.g., the input beam 302(X)) are incident on same locations of the intermediate-component 114 at a same time. Such dark lines with arrows are representative of pathways of light traveling within intermediate-component 114 of the waveguide 100. If the optical-length of each pathway (also known as an optical path length) were the same, then when the light beams traveling to the same point via different pathways are recombined they would add in a manner that results in constructive interference. More specifically, when beams of light from different paths have the same optical path lengths and the same polarization orientation and are imaged onto the same part of a retina of a human eye, the light constructively interferes and intensity is equal to the scalar sum of the beams. However, due to mechanical tolerances between the different pathways, the path length of the light following different pathways to a same location (on the intermediate-component 114) will actually be different, which can result in (total or partial) destructive interference, which causes the intensity of the light to diminish when imaged by a user's eye. More specifically, when beams of light from different paths have different optical path lengths and are imaged onto the same part of a retina of a human eye, the light destructively interferes and intensity is less than the scalar sum of the beams. Such destructive interference can cause dark fringes, and more generally, can cause a non-uniform intensity distribution in the light that eventually reaches the output-coupler 116 and exits the waveguide 100. More generally, the multiple-loop interference, if not compensated for, can cause variations in intensity that would be perceptible to a human eye viewing an image that is replicated using the waveguide, which is undesirable.

Depending on the orientation of the various components 112, 114 and 116 of the waveguide, these components may diffract light of incident polarization at different intensities. For example, there can be an approximately five-to-one (i.e., ~5:1) difference between orthogonal horizontal and vertical diffraction efficiency. If the incident polarization is not optimized for specific grating line orientations of the various components 112, 114 and 116 at certain angles, diffraction efficiency can suffer, which can cause dark areas to occur in an image that is replicated using the waveguide and being viewed by a human eye, which is undesirable.

The polarization of light specifies the orientation of the plane that the light wave's electric field oscillates in. Explained another way, the polarization of light is the state of its electric field vector (e-vector) orientation. Light can, for example, be non-polarized (a completely disordered, chaotic orientation of the e-vector), linearly polarized (e-vector oscillates in a plane that is constant), circularly polarized, or elliptical polarized. Linearly polarized light can be, e.g., horizontally polarized light or vertically polarized light, but is not limited thereto. The type of polarization that is ideal in an imaging system depends on many factors, including, e.g., the types and orientations of the components 112, 114 and 116. For a specific example, referring briefly back to FIG. 1A, assume that each of the components 112, 114 and 116 is an SRG type DOE that including grating lines. Further, assume that the input-coupler 112 includes vertical grating lines, and intermediate-component 114 includes 45 degree (diagonal) grating lines, and the output-coupler includes horizontal grating lines. In such an imaging system, the light that is incident on the input-coupler 112 would ideally be vertically polarized; the intermediate-component 114 would ideally rotate the polarization of the light by precisely 90 degrees (so that it becomes horizontally polarized); and that light when incident on the output-coupler 116 (where it is out coupled from the waveguide 100) would ideally be horizontally polarized. However, this is not what would typically occur. The intermediate-component 114 (e.g., gratings thereof) will cause a majority of the polarization rotation, but TIR also causes an angularly-dependent polarization rotations. Further, the input-coupler 112 and output-coupler 116 can also cause some undesired polarization rotation. In other words, in such an implementation the intermediate-component 114 does not simply rotate the polarization of all the light that it diffracts by precisely 90 degrees, and thus, this results in a polarization non-uniformity across the output-coupler 116.

The exemplary waveguide 100 shown in and described with reference to FIGS. 1-4 is for use in an imaging system that relies on pupil replication. In such systems, i.e., systems that rely on pupil replication, the output pupils are preferably uniformly overlapping for all angles. When this is not the case, e.g., because pupils are spaced too far apart from one another, angular-dependent spatial-non-uniformities in intensity arise, which manifest themselves as bright and dark image artifacts, which are undesirable.

Figure 5A:
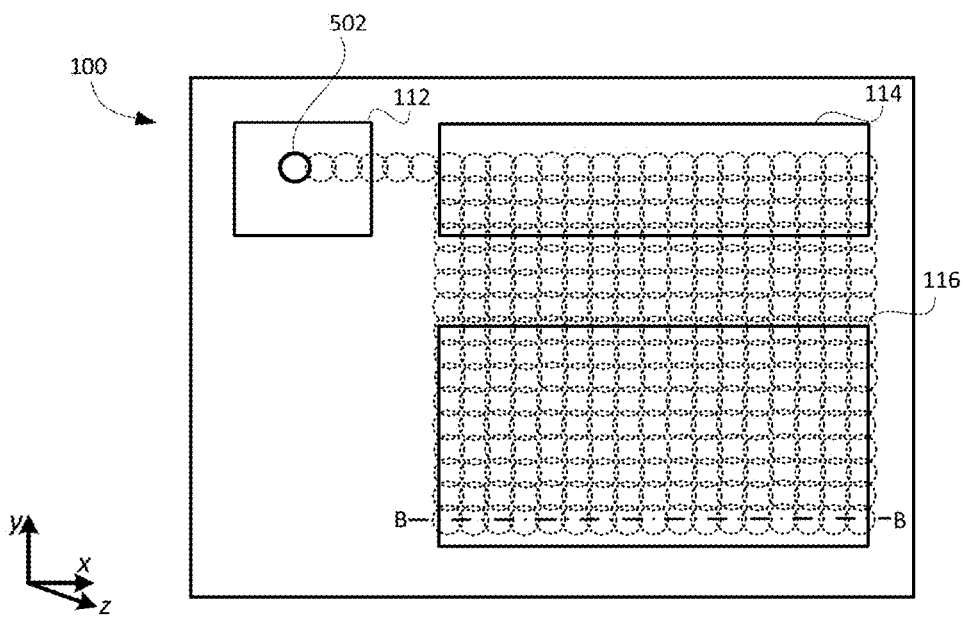
FIG. 5A is used to conceptually illustrate how a pupil is replicated within a waveguide.

FIG. 5A is used to conceptually illustrate how a pupil, represented by the solid-lined circle 502, is replicated, as light travels by way of TIR from the input-coupler 112 to the intermediate-component 114, and by way of TIR from the intermediate-component 114 to the output-coupler 116, where it exits the waveguide 100. In FIG. 5A, each of the dotted-lined circles represents a replication of the pupil 502, which may also be referred to simply as a pupil. While represented as circles in FIG. 5A, each pupil is actually a collection of angles. When light exits the waveguide 100, proximate the output-coupler 116, a human eye, which has a lens in it, receives the collection of angles associated with a pupil and coverts it back to an image, e.g., the image produced by the display engine 204 in FIG. 2. Where the waveguide 100, and more specifically the components 114 and/or 116 thereof is/are configured to perform pupil expansion, when an expanded pupil and is converted to an image (by the lens of a human eye), the resulting image is expanded relative to the original image (e.g., produced by the display engine 204 in FIG. 2).

Figure 5B:
FIG. 5B illustrates an exemplary pupil distribution along the line B-B shown in FIG. 5A.
Figure 5C:
FIG. 5C illustrates an alternative pupil distribution, corresponding to a situation where there is no pupil overlap between pupils replicated within a waveguide.
Figure 5D:
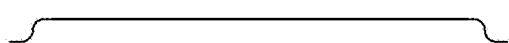
FIG. 5D illustrates a substantially uniform pupil distribution.

FIG. 5B conceptually illustrates an exemplary pupil distribution along the dashed line B-B shown in FIG. 5A, which pupil distribution is shown as having a generally sinusoidal function, due to each pupil have a Gaussian intensity distribution and adjacent pupils only slightly overlapping one another. If the pupils were so spread apart that they did not overlap at all, and each of the pupils had a top-hat intensity distribution, then the pupil distribution can potentially have a square wave function, e.g., as shown in FIG. 5C, although a sinusoidal function (an example of which is shown in FIG. 5B) is more likely. Pupil distributions having a sinusoidal or square wave function will manifest themselves as bright and dark image artifacts, which are undesirable. Optimally, the pupils will overlap one another to achieve a uniform pupil distribution, which provides for a uniform intensity distribution function, as shown in FIG. 5D, which can be achieved, e.g., if there was a 50% overlap between pupils. More generally, there is a desire to homogenize pupil overlap to provide a substantially uniform pupil distribution in the light traveling within the waveguide that is incident on the output-coupler 116.

Figure 6:
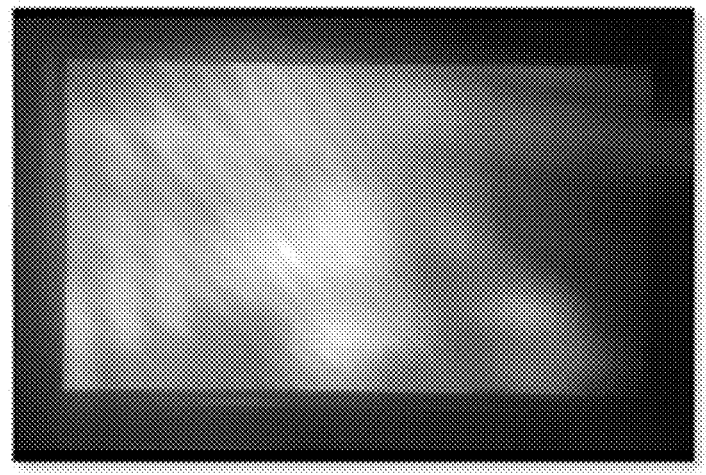
FIG. 6 is used to illustrate non-uniformities in local and global intensities which may occur when performing imaging, and more specifically pupil replication, using an optical waveguide.

FIG. 6 is used to illustrate that non-uniformities in local and global intensity which may occur when performing imaging using an optical waveguide, wherein the non-uniformities can occur due to multiple-loop interference, non-optimal polarization and/or non-uniform pupil distribution. More specifically, the dark and light generally diagonal fringes are illustrative of non-uniformities in local intensity that occur do to the pupil distribution being non-uniform, and the dark blotches (shown primarily on the right side) are illustrative of non-uniformities in local intensity that occur due to multiple-loop interference.

Embodiments of the present technology, which are described below, can be used to compensate for multiple-loop interference, provide for more optimized polarization and/or provide for a more uniform pupil distribution. More generally, embodiments of the present technology, which are described below, are utilized to cause the light that is output from a waveguide (e.g., 100) by an output-coupler (e.g., 116) to have a more uniform intensity distribution, so that any non-uniformity in intensity is imperceptible to a human eye viewing an image using the waveguide.

Certain embodiments described herein compensate for multiple-loop interference, and more specifically mitigate the adverse effects of multiple-loop interference, by utilizing polarization rotations and/or wave front phase diversity. If two beams of coherent polarized light following different paths are recombined, but the polarization of a beam following one path is rotated by 90 degrees relative to a beam following the other path, then the two beams will not interfere with one another when they are recombined. Accordingly, orthogonal polarization of light in one path versus another path causes that the light to interact less when imaged onto the same point on a retina of a human eye, which is advantageous. Certain embodiments of the present technology, described below, rely on this phenomenon to mitigate the adverse effects they may otherwise be caused by multiple-loop interference. Certain embodiments additionally, or alternatively, provide enough wave front phase diversity such that effects of destructive interference (e.g., due to different light beams imaged on the same portion of a retina being completely out of phase) become averaged out.

Without utilizing one or more of the embodiments of the present technology described herein, the light traveling within the waveguide and incident on the output-coupler, would likely have a generally homogeneous polarization, and more specifically, would have one polarization that is quite dominant compared to the other. Embodiments of the present technology can be used to provide, for light traveling within the waveguide and incident on the output-coupler, a ratio of horizontally polarized light to vertically polarized light, or vice versa, of no more than 2 to 1, and preferably about 1 to 1. For light incident on the output-coupler (after having traveled through the waveguide), where the ratio of horizontally polarized light to vertically polarized light, or vice versa, is not more than 2 to 1, such light is considered to have a substantially heterogeneous polarization distribution.

In accordance with certain embodiments, the phases of wave fronts of light traveling through a waveguide are offset relative to one another to achieve an averaging between constructive and destructive interference. More specifically, in accordance with certain embodiments, sufficient wave front phase diversity is achieved such that light exiting the waveguide, at its output-coupler, has a substantially heterogeneous phase in its wave fronts, so that there is a substantially uniform distribution, between 0 and $2\pi$ radians, of the phases of the wave fronts of light.

More generally, embodiments of the present technology described herein are used to achieve a substantially uniform intensity distribution in the light that exits a waveguide (e.g., 100) via an output-coupler (e.g., 116). A substantially uniform intensity distribution can be a substantially uniform angular intensity distribution, or a substantially uniform spatial intensity distribution, depending upon implementation. It is also possible that substantially uniform intensity distribution can be both a substantially uniform angular intensity distribution, and a substantially uniform spatial intensity distribution. A substantially uniform angular intensity distribution is especially beneficial in applications where the location of a user's eye(s) is/are fixed relative to the waveguide(s), e.g., in a head-mounted-display (HMD) or other near-eye-display (NED) application. A substantially uniform spatial intensity distribution is especially beneficial in applications where the location of a user's eye(s) is/are not fixed relative to the waveguide(s), e.g., in a heads-up-display (HUD) application. The overall goal of having the light, output by the waveguide, having a substantially uniform intensity distribution is so that any non-uniformity in intensity is imperceptible to a human eye viewing an image using the waveguide.

An intensity distribution can have both a local intensity distribution and a global intensity distribution. The local intensity distribution refers to a distribution of intensities associated with portions of an image that are relatively close to one another, e.g., associated with adjacent pixels and/or adjacent angular content of an image. The global intensity distribution refers to a distribution of intensities associated with an entire image, which includes pixels and/or angular content of an image that are relative far apart.

Without using embodiments of the present technology, or alternative techniques for compensating for non-uniform intensity distributions (if such alternative techniques exist), the light that is output from a waveguide by an output-coupler will have a non-uniform intensity distribution that would be very noticeable to a human eye viewing an image that is reproduced using the waveguide. More specifically, certain portions of an image would appear significantly brighter than other portions, and certain portions of the image would appear significantly darker than other portions. An example of this can be appreciated from FIG. 6, discussed above.

More specifically, without using embodiments of the present technology, or alternative techniques for compensating for non-uniform intensity distributions (if such alternative techniques exist), there would likely be at least a ten-percent change in intensity per degree in the angular content of an image, e.g., such as in adjacent pixels of an image. In other words, the local intensity distribution would likely be characterized by at least a ten-percent change in intensity per degree in the angular content of the image. Further, without using embodiments of the present technology, or alternative techniques for compensating for non-uniform intensity distributions (if such alternative techniques exist), there would likely be at least a sixty-percent change in intensity over the entire angular content of an image. In other words, the global intensity distribution would likely be characterized by at least a sixty-percent change in intensity over the entire angular content of the image.

Embodiments of the present technology, which are described herein, are intended to be used to provide for a substantially uniform intensity distribution, wherein variations in intensity would be imperceptible to a human eye viewing an image that is replicated using a waveguide. More specifically, embodiments of the present technology can be used to provide a substantially uniform intensity distribution in light that is output from a waveguide by an output-coupler (e.g., 116), which means that there is no more than a two-percent change in intensity per degree in the angular content of an image (e.g., such as in adjacent pixels of an image) and there is no more than a thirty-percent change in intensity over the entire angular content of the image. In other words, embodiments of the present technology can be used to achieve a local intensity distribution characterized by no more than a two-percent change in intensity per degree in the angular content of the image, as well as to achieve a global intensity distribution characterized by no more than a thirty-percent change in intensity over the entire angular content of an image. Accordingly, embodiments of the present technology can be used to improve local uniformity by at least a factor of five, and to improve the global uniformity by at least a factor of two, compared to if such embodiments were not used.

Liquid Crystal Polymer (LCP) Coating

Figure 7:
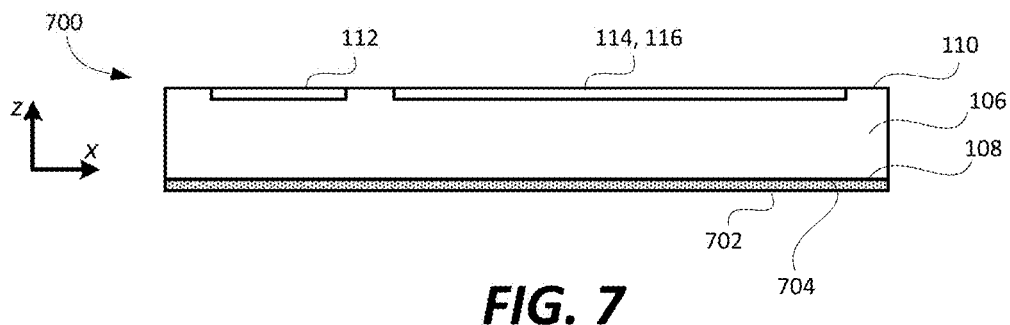
FIG. 7 is a top view of a waveguide that that utilizes a liquid crystal polymer (LCP) coating to improve the uniformity in the intensity of light that exits the waveguide, in accordance with certain embodiments of the present technology.

Referring now to FIG. 7, in accordance with certain embodiments of the present technology, a waveguide 700 includes a liquid crystal polymer (LCP) coating 702 is provided on at least one of the major planar surfaces (e.g., 108) of the bulk-substrate 106. In such embodiments, the LCP coating 702 will induce spatially-dependent polarization changes in beams of light that are incident on the LCP coating 702 while traveling through the bulk-substrate 106 of the waveguide 100 by means of TIR. The LCP coating 702 can be added to the waveguide 100 to provide more heterogeneous polarization and compensate multiple-loop interference caused by the intermediate-component 114. Additionally, if the LCP coating 702 is thick enough to increase wave front phase diversity, then the LCP coating 702 can also provide for a more uniform pupil distribution.

The LCP coating 702 is an optically anisotropic and birefringent material that has an index of refraction (also known as a refractive index) that depends on the polarization and propagation direction of light. Accordingly, when light travelling within the bulk-substrate 106 is incident on the LCP coating 702, the birefringence of the coating causes the light to be split by polarization into two rays taking slightly different paths. Considering the combined transverse electric (TE) and transverse magnetic (TM) modes of the light propagating through the waveguide 100, the LCP coating 702 acts as retarder (i.e., polarization rotator) to the polarization state of light propagating through it. The degree of retardation (i.e., polarization rotation) is a function of the alignment of the liquid crystal molecules and the thickness of the LCP coating 702, which can also be referred to as an LCP film. When light propagates through the LCP coating the polarization state is changed and two beams of light that would otherwise destructively interfere (without the LCP coating) will no longer destructively interfere, which helps improve the uniformity of the output.

In certain embodiments, the LCP coating 702 has a uniaxial birefringence, which means that there is a single direction governing the optical anisotropy whereas all directions perpendicular to the single direction (or at a given angle relative to the single direction) are optically equivalent. Where the LCP coating has a uniaxial birefringence, the LCP coating has a different index of refraction along one of three axis (e.g., the index of refraction in an x-direction differs from the index of refraction in the y- and z-directions). In other embodiments, the LCP coating has a biaxial birefringence, in which case the LCP coating can have a different index of refraction along all three axis.

Where the components 112, 114 and 116 are all provided in or on a same major planar surface (e.g., 110) of the bulk-substrate 106, the LCP coating can be applied on the opposite major planar surface (e.g., 108), as shown in FIG. 7. Where the components 112, 114 and 116 are embedded in the bulk-substrate 106, the LCP coating can be applied on one or both of the major planar surfaces (e.g., 108 and/or 110). Where at least one of the components 112, 114 or 116 is provided in or on one of the major planar surfaces (e.g., 110), and at least another one of the components 112, 114 or 116 is provided in or on the other one of the major planar surfaces (e.g., 108), then an LCP coating can be provide on opposite sides of any one of (or all of) the components 112, 114 and 116, e.g., such that an LCP coating overlaps (partially or completely) one of (or all of) the components 112, 114 and 116. In other words, a first LCP coating can cover one or more portions of one of the major planar surfaces (e.g., 110), and a second LCP coating can cover one or more portions of the other one of the major planar surfaces (e.g., 108). The two LCP coatings can both be made of the same LCP coating material, or of different LCP coating materials, and the thicknesses of the two LCP coatings may be the same, or different than one another.

The LCP coating 702 can cover an entire major planar surface(s) (e.g., 108 and/or 110), as shown in FIG. 7, or just portions thereof. For example, the LCP coating 702 can cover a portion of a major planar surface that spatially overlaps (in the x and y directions) the entire input-coupler 112 (or overlaps just a portion of the input-coupler 112), a portion of a major planar surface that spatially overlaps the entire intermediate-component 114 (or overlaps just a portion of the intermediate-component 114), and/or a portion of a major planar surface that spatially overlaps the entire output-coupler 116 (or overlaps just a portion of the output-coupler 116).

In accordance with specific embodiments, a thickness of the LCP coating 702 is within a range of about 100 nm to 1500 nm. Accordingly, in such embodiments the LCP coating 702 is significantly thinner than the bulk-substrate 106. Where an LCP coating is provided on both major planar surfaces of a waveguide, the thickness of the LCP coatings can be the same, or different from, one another, as noted above. Further, as noted above, the types of LCP coatings can be the same as, or different than, one another.

If an LCP coating only coincides with the input-coupler 112, or portions thereof, then the LCP coating would help randomize the polarization of light beams that enter the waveguide 100 through the input-coupler 112, as portions of such light reflect off a boundary 704 between the bulk-substrate 106 and the LCP coating 702, and other portions of such light diffract into the LCP coating 702. In other words, in such an embodiment, the LCP coating 702 would help provide a heterogeneous polarity distribution of light traveling within and eventually exiting the waveguide. However, if the LCP coating does not coincide with the intermediate-component 114, then the LCP coating would not mitigate the adverse effects of multiple-loop interference described above, e.g., with reference to FIG. 4.

The LCP coating 702 can be patterned with a defined orientation throughout the coating. Patterning of the molecules can occur in any dimension of the LCP coating, and could also be uniform or completely random. The thickness of the LCP coating could vary from very thin (~100 nm) to very thick (>1 μm), as mentioned above. The LCP coating can be patterned using photoalignment layers or other liquid crystal alignment techniques, such as, but is not limited to, rubbed polyimides, physical relief structures on a glass surface, monolayer coatings, etc. The properties of the LCP coating that can be tuned include, but are not limited, the coating thickness, extraordinary and ordinary indices of refraction, liquid crystal angles, periodicity in any dimension of patterning, directionality of patterning relative to surface relief gratings, sharpness of features between patterned and non-patterned area of liquid crystal, etc.

Mismatched Index of Refraction Coating or Substrate

Figure 8:
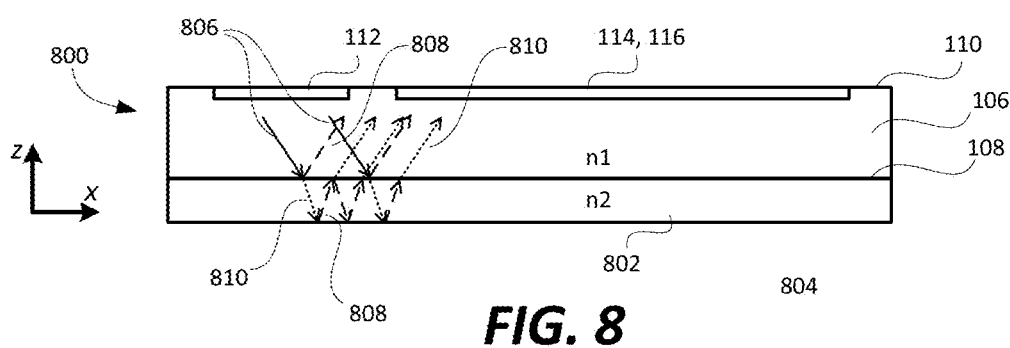
FIG. 8 is a top view of a waveguide that utilizes materials having mismatched indexes of refraction to improve the uniformity in the intensity of light that exits the waveguide, in accordance with certain embodiments of the present technology.

Referring now to FIG. 8, in accordance with certain embodiments of the present technology, a waveguide 800 includes a transparent planar optical-component 802 that has a different index of refraction than the bulk-substrate 106 (in or on which the components 112, 114 and 116 are formed) and is located adjacent to and adhered to one of the major planar surfaces 108 or 110 of the bulk-substrate 106. More specifically, the bulk-substrate 106 has an index of refraction n1, and the optical-component has an index of refraction n2, where n2≠n1. The thickness of the planar optical-component 802, which can also be referred to as the adjacent optical-component 802, is at least ten times (i.e., 10×) the wavelength of the light for which the substrate is being used as an optical transmission medium, and thus, the planar-optical component 802 is also a bulk-substrate, albeit a different bulk-substrate than the bulk-substrate 106 (in or on which the components 112, 114 and 116 are formed). Stated another way, the adjacent planar optical-component 802 is a coating or substrate (e.g., a plate) that has a mismatched index of refraction relative to the bulk-substrate 106 (in or on which the components 112, 114 and 116 are formed).

Optical components are considered to have different indexes of refraction from one another so long as their respective indexes of refraction differ from one another by at least 0.05. Conversely, optical components are considered to have substantially the same indexes of refraction if their respective indices of refraction differ from one another by less than 0.05. Optical components are considered to have significantly different indexes of refraction, as the term is used herein, if their respective indexes of refraction differ from one another by at least 0.20.

In FIG. 8, reference 804 represents the physical boundary between the bulk-substrate 106 and the adjacent planar optical-component 802. The adjacent planar optical-component 802 can be made of glass or optical plastic. Alternatively, adjacent planar optical-component 802 can be a coating that is deposited on one of the major planar surfaces 108 or 110 of the bulk-substrate 106. In certain embodiments, the adjacent planar optical-component 802 is made of an isotropic material, in which case the planar optical-component 802 has the same optical properties in all directions (e.g., the x, y and z directions). In other embodiments, the adjacent planar optical-component 802 is made of an anisotropic material, in which case the planar optical-component 802 has the different optical properties in different directions (e.g., the optical properties in the x direction differ from the optical properties in at least one of the y and z directions). In a specific example, the planar optical-component 802 that has a mismatched index of refraction relative to the bulk-substrate 106 (in or on which the components 112, 114 and 116 are formed) can be an LCP coating. In other words, the LCP coating 702 (described above with reference to FIG. 7) can be the planar optical-component 802 having a mismatched index of refraction relative to the bulk-substrate 106 (which is described with reference to FIG. 8).

In certain embodiments, the adjacent planar optical-component 802, whether made of an isotropic material or an anisotropic material, can be configured to act as a selective reflector for certain polarizations and/or angles of light. Where the adjacent planar optical-component 802 is anisotropic, the axial component of the coating can be applied in different geometries relative to the waveguide geometry (in dependence on the direction of different DOEs) to optimize performance.

Referring specifically to FIG. 8, the arrowed solid lines 806 are representative of light that is coupled into the bulk-substrate 106 (by the input-coupler 112) and propagates through the bulk-substrate 106 having the index of refraction n1, towards the boundary 804 (between the bulk-substrate 106 and the adjacent planar optical-component 802 having the index of refraction n2). As specified by the Fresnel equations and Snell's law, where light traveling within the bulk-substrate 106 is incident on the boundary 804 at an angle of incidence that is below the critical angle (as specified by Snell's law), a first portion of the light that is incident on the boundary 804 (between the bulk-substrate 106 and the adjacent planar optical-component 802) reflects off the boundary 804 and remains in the bulk-substrate 106, and a further portion of the light that travels within the bulk-substrate 106 and is incident on the boundary 804 is refracted into the adjacent planar optical-component 802. In FIG. 8, the arrowed dashed lines 808 correspond to light that is reflected at the boundary 804, and the arrowed dotted lines 810 correspond to light that is refracted at the boundary 804. After further reflections (by the major planar surface of the planar optical-component 802 opposite the boundary 804), some of that light will be reflected off the boundary 804 (between the bulk-substrate 106 and the adjacent planar optical-component 802) and remain within the adjacent planar optical-component 802, and some of that light will be refracted back into the bulk-substrate 106. This phenomena will continue along the length of the waveguide such that some portions of the light will travel different path lengths than other portions of the light. This will have the effect of providing for wave front phase diversity that can provide for a uniform wave front phase distribution of the light by the time the light is incident on the output-coupler 116. It is noted that only a few of the reflections and refractions of light are shown in FIG. 8, so as to not make the figure too cluttered. Where light traveling within the bulk-substrate and incident on the boundary 804 is above the critical angle (as specified by Snell's law), the light that is incident on the boundary 804 (between the bulk-substrate 106 and the adjacent planar optical-component 802) with experience TIR, and none of that light will be refracted into the adjacent planar optical-component 802.

Where the waveguide includes an intermediate-component 114 that is susceptible to multiple-loop interference, which was described above with reference to FIG. 4, there are benefits to the light (that is to be imaged onto the same point on a retina of a human eye) travelling numerous different path lengths before being recombined. As noted above, if the beams of light from different paths have the same optical path lengths and the same polarization orientation and are imaged onto the same part of a retina of a human eye, the light constructively interferes and intensity is equal to the scalar sum of the beams, which would be advantageous, but would be very difficult to achieve in practice for all possible optical paths. Conversely, if the beams of light from different paths have the different optical path lengths, such that they are exactly 180 degrees out of phase, with the same polarization orientation, total destructive interference would occur, essentially destroying the image or pupil intended by be replicated using the waveguide. More specifically, if two beams of coherent light are completely (i.e., 180 degrees, or π radians) out of phase, then destructive interference will occur if the beams of light are imaged onto the same point of a retina of a human eye, which would result in dark image artifacts, which are undesirable. By causing light (that is to be imaged onto the same point on a retina of a human eye) to travel through multiple different path lengths, through use of the adjacent planar optical-component 802 (which has a mismatched index of refraction relative to the bulk-substrate 106 in or on which the components 114, 116 and 118 are included), destructive interference will be averaged out, which has the beneficial effect of compensating for the multiple-loop interference. In other words, one of the purposes of adding the adjacent planar optical-component 802, which has a mismatched index of refraction relative to the bulk-substrate 106 (in or on which the components 112, 114 and 116 are formed), is to compensate for the multiple-loop interference caused by the intermediate-component 114.

Another one of the purposes of adding the adjacent planar optical-component 802, which has a mismatched index of refraction relative to the bulk-substrate 106 (in or on which the components 112, 114 and 116 are formed), is to improve and preferably achieve a substantially uniform pupil distribution, or more generally, to decrease pupil replication artifacts. For example, referring back to FIGS. 5A-5D, adding the adjacent planar optical-component 802, which has a mismatched index of refraction relative to the bulk-substrate 106, can be used to change a waveguide that would otherwise having a pupil distribution corresponding to the functions shown in FIG. 5B or 5C into a substantially uniform pupil distribution function, as shown in FIG. 5D.

In certain embodiments, the index of refraction n2 of the adjacent planar optical-component 802 is greater than the index of refraction n1 of the bulk-substrate (i.e., n2>n1). In other embodiments, the index of refraction n2 of the adjacent planar optical-component 802 is less than the index of refraction n1 of the bulk-substrate (i.e., n2<n1). Where the index of refraction n2 of the adjacent planar optical-component 802 is less than the index of refraction n1 of the bulk-substrate 106, there is a further advantage as there is a secondary TIR condition. For example, if n1=1.7 and n2=1.5, the critical angle where TIR occurs is 62.9 degrees relative to a normal to the boundary 804. Accordingly, light traveling within the bulk-substrate 106 that is incident on the boundary 804 having an angle of incidence (relative to the normal to the boundary 804) that is above 62.9 degrees never refracts out of the bulk-substrate 106 into the adjacent planar optical-component 802. These high angles of incidence are most problematic for pupil replication. In these embodiments, the apparent thickness of the waveguide will be less for light having high angles of incidence compared to for light having lower angles of incidence, where the light, or at least portions thereof, will propagate through both the bulk-substrate 106 and the adjacent planar optical-component 802. Accordingly, the distance between the reflection nodes will be shorter for light beams having high angles of incidence (compared to light beams having lower angles of incidence) and the spatial profile of the output distribution will be more homogeneous due to more closely overlapped pupils.

The adjacent planar optical-component 802 (that has a mismatched index of refraction relative to the bulk-substrate 106) can be attached or otherwise applied to the bulk-substrate 106 in various different manners. For example, where implemented as a coating material, the coating material can be applied through various manufacturing processes including, but is not limited to, lamination, wet coating (e.g., spin coating), deposition techniques, etc.

In FIG. 8, the adjacent planar optical-component 802 (that has a mismatched index of refraction relative to the bulk-substrate 106) is shown as being added adjacent to only one of the major planar sides of the bulk-substrate 106. In other embodiments, two adjacent planar optical-components (that have a mismatched index of refraction relative to the bulk-substrate 106) can be added so that they are adjacent to both major planar side of the bulk-substrate 106 (i.e., one adjacent to each opposing side). In such embodiments, the two adjacent planar optical-components, added adjacent to opposing both major planar sides of the bulk-substrate 106, can have the same index of refraction as one another, or different indexes of refraction than one another. In still other embodiments, the bulk-substrate 106 can be separated into two halves (that are parallel to the major surfaces 108 and 110), and the planar optical-component 802 (that has a mismatched index of refraction relative to the bulk-substrate 106) can be embedded between the two halves, where it can act as a volume layer.

Liquid Crystal Polymer (LCP) Based Surface Relief Grating (SRG)

A diffraction grating is an optical component with a periodic structure. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends both on the wavelength of light incident on the SRG and various optical characteristics of the SRG, such as line spacing, groove depth and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area.

As noted above, in the discussion of FIGS. 1A-1C, the input-coupler 112, the intermediate-component 114 and/or the output-coupler 116 can be an SRG. Where this is the case, an SRG can be formed "in" the bulk-substrate 106 by etching the SRG into one of the major planar surfaces 108 or 110 of the bulk-substrate 106, or an SRG can be formed "on" the bulk-substrate 108 by formed the SRG in an isotropic coating that covers one of the major planar surfaces 108 or 110 of the bulk-substrate 106.

In specific embodiments of the present technology, rather than forming SRG(s) in an isotropic coating that covers one of the major planar surfaces 108 or 110 of the bulk-substrate 106, one or more of the SRG(s) are instead formed in a liquid crystal polymer (LCP) coating. Accordingly, where any of the components 112, 114 or 116 is an SRG formed in an LCP coating, the component can be referred to as an LCP based SRG. In other words, referring back to FIGS. 1A, 1B and 1C, any one, two, or all of the input-coupler 112, the intermediate-component 114 and the output-coupler 116 can be implemented as an LCP based SRG. In such embodiments, effects of an SRG being made from an LCP would occur at every interaction of light with the LCP based SRG.

An LCP coating, as noted above in the discussion of the embodiments discussed with reference to FIG. 7, is an optically anisotropic and birefringent material that has an index of refraction (also known as a refractive index) that depends on the polarization and propagation direction of light. More specifically, whereas an isotropic polymer coating has a uniform index of refraction in all directions, an anisotropic birefringent LCP coating has different indices of refraction along at least one axis of the material (one axis differs from the other two for uniaxial birefringent materials; and all three axis could be different for bi-axial birefringent materials).

Forming one or more of the components 112, 114 and/or 116 as an LCP based SRG enables more control of the refraction/diffraction of light incident on the SRG. This is because different polarizations and angles of propagation will experience different indices of refraction of the LCP based SRG and could result in differences in diffraction efficiency and uniformity.

The LCP in which SRG(s) is/are formed could be aligned through alignment layers or holographic techniques. For example, in certain embodiments, a combined nano-imprint lithography can be used to achieve a desired physical surface structure, and a holographic exposure can be used to achieve a desired liquid crystal alignment. Other implementations are also possible, and within embodiments of the present technology.

If orientated appropriately, an LCP based SRG can act like a wave retarder and rotate the polarization state of an incoming beam. For example, if the input-coupler 112 and the output-coupler 116 are both LCP based SRGs, where the output-coupler 116 has grating lines that are orthogonal to the input-coupler 112, this should increase the optical efficiency of the waveguide. Additionally, implementing the intermediate-component 114 as an LCP based SRG should also increase the optical efficiency of the waveguide.

Where the input-coupler 112, the intermediate-component 114 and/or the output-coupler 116 is/are an LCP based SRG, each such LCP based SRG can be formed on one of the major planar surfaces 108 or 110 of the bulk-substrate 106. It is also possible that at least one of the input-coupler 112, the intermediate-component 114 or the output-coupler 116 is an LCP based SRG formed on one of the major planar surfaces (e.g., 108) of the bulk-substrate 106, while at least one other one of the input-coupler 112, the intermediate-component 114 or the output-coupler 116 is an LCP based SRG formed on the other one of the major planar surfaces (e.g., 110) of the bulk-substrate 106.

In embodiments where the waveguide 100 includes an intermediate-component 114 that is implemented as an LCP based SRG, the various light beams that are reflected and diffracted by the surface relief grating lines of the intermediate-components 114 will end up having a heterogeneous polarization distribution. This is beneficial in that the heterogeneous polarization distribution compensates that the adverse effects of the multiple-loop interference that, if not compensated for, would cause non-uniformities in local intensity.

Double-Sided Diffractive Optical Elements

As noted above, in the discussion of FIGS. 1A, 1B and 1C, in certain embodiments the input-coupler 112, the intermediate-component 114 and the output-coupler 116 can all be implemented as SRGs. Such SRGs can all be located in or on the same one of the major planar surfaces 108 or 110 of the bulk-substrate 106 of the waveguide 100. Alternatively, it is also possible that at least one of the input-coupler 112, the intermediate-component 114 or the output-coupler 116 is an SRG formed in or on one of the major planar surfaces (e.g., 108) of the bulk-substrate 106, while at least one other one of the input-coupler 112, the intermediate-component 114 or the output-coupler 116 is an SRG formed in or on the other one of the major planar surfaces (e.g., 110) of the bulk-substrate 106.

Figure 9A:
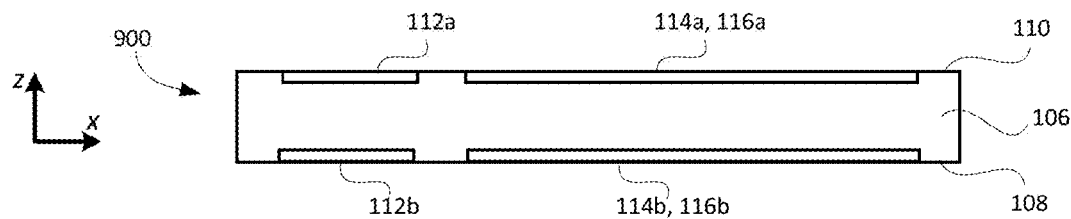
FIGS. 9A and 9B are, respectively, top and side views of a waveguide that includes double-side diffractive optical elements (DOEs) to improve the uniformity in the intensity of light that exits the waveguide, in accordance with certain embodiments of the present technology.
Figure 9B:
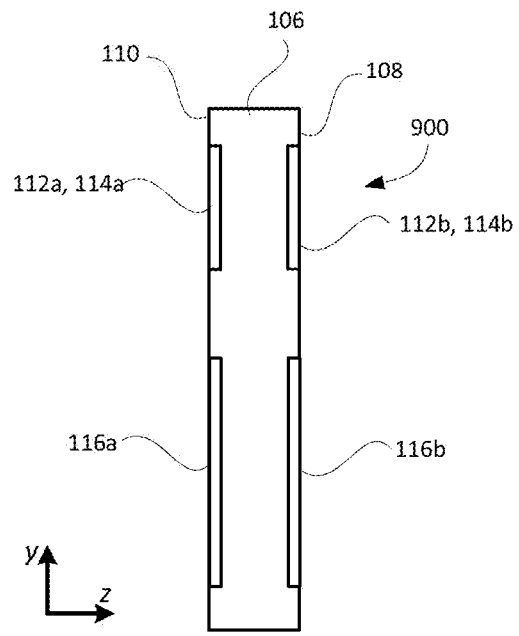

In certain embodiments of the present technology, which will now be discussed with reference to FIGS. 9A and 9B, any one, two or all of an input-coupler, an intermediate-component or an output-coupler can be implemented as a double-sided SRG, or more generally, as a double-sided DOE. FIGS. 9A and 9B are, respectively, top and side views of a waveguide 900 wherein each the input-coupler, the intermediate-component and the output-coupler are implemented as double-sided DOEs. The front view of the waveguide 900 can look, e.g., the same as or similar to the front view of the waveguide 100 shown in FIG. 1A. Such a front view of the waveguide 900 is not included, since the front view would not show how the input-coupler, the intermediate-component and the output-coupler are implemented as double-sided DOEs, because DOEs on one of the planar major surfaces 108 or 110 of the bulk-substrate 106 would completely overlap the DOEs on the other one of the planar major surfaces.

Referring to FIGS. 9A and 9B, where the input-coupler is a double-sided DOE, the input-coupler includes a DOE 112$a$ on the major planar surface 110 as well as a DOE 112$b$ on the other major planar surface 108. Accordingly, such an input-coupler can be referenced as the input-coupler 112$a$-$b$. Where the intermediate-component is a double-sided DOE, the intermediate-component includes a DOE 114$a$ on the major planar surface 110 as well as a DOE 114$b$ on the other major planar surface 108, and thus, can be referenced as the intermediate-component 114$a$-$b$. Similarly, where the output-coupler is a double-sided DOE, the output-coupler includes a DOE 116$a$ on the major planar surface 110 as well as a DOE 116$b$ on the other major planar surface 108, and thus, can be referenced as the output-coupler 116$a$-$b$. The input-coupler 112$a$-$b$, the intermediate-component 114$a$-$b$ and the output-coupler 116$a$-$b$ can be collectively referenced as double-sided DOE components 112$a$-$b$, 114$a$-$b$ and 116$a$-$b$.

In accordance with certain embodiments, the grating period and orientation of each DOE, of a pair of DOEs associated with one of the components 112$a$-$b$, 114$a$-$b$ or 116$a$-$b$, are precisely matched so as to not adversely affect the modulation transfer function (MTF) of the imaging system and/or produce double imaging. For example, for the component 112$a$-$b$, the grating period and orientation of the DOE 112$a$ are precisely matched to (i.e., the same as) the grating period and orientation of the DOE 112$b$. Similarly, for the component 114$a$-$b$, the grating period and orientation of the DOE 114$a$ are precisely matched to the grating period and orientation of the DOE 114$b$; and for the component 116$a$-$b$, the grating period and orientation of the DOE 116$a$ are precisely matched to the grating period and orientation of the DOE 116$b$.

In accordance with certain embodiments, included in an opposing pair DOEs, associated with one of the components 112$a$-$b$ and 116$a$-$b$, is both a transmission grating and a reflective grating. For example, for the component 112$a$-$b$, the DOE 112$a$ can be a transmissive grating and the DOE 112$b$ can be reflective grating. For another example, for the component 116$a$-$b$, the DOE 116$a$ can be a reflective grating, and the DOE 116$b$ can be a transmissive grating. Other variations are also possible, and are within embodiments of the present technology. Where the intermediate-component is a double-sided DOE, both DOEs should be reflective gratings, because the intermediate-component is not intended to couple light out of the waveguide. In other words, for the component 114$a$-$b$, the DOE 114$a$ and the DOE 114$b$ should both be reflective gratings.

For a single-sided DOE waveguide, polarization and phase changes are only introduced in light propagating through the bulk-substrate (e.g., 106) when they interact with the DOE. With the double-sided DOE orientation, where DOEs are included in or on both major planar sides 108 and 110 of the bulk-substrate 106, twice the number of diffractive interactions are induced, wherein each interaction with a DOE induces phase and polarization changes. More specifically, the use of double-sided DOEs will increase the phase diversity of the wave fronts of light traveling within the waveguide, since light that is not diffracted by a first DOE (of a pair) but is diffracted by a second DOE (of the pair) will have traveled a greater path length (having traveled through the thickness of the bulk-substrate 106) before being incident on the second DOE (of the pair). Further, where every diffraction and/or reflection from a DOE causes a polarization rotation, the inclusion of DOEs in or on both major planar sides 108 and 110 of the bulk-substrate 106 will induce twice the number of polarization rotations, which will provide for a heterogeneous polarization distribution. Accordingly, the inclusion of double-sided DOEs can be used to compensate for multiple-loop interference caused by the intermediate-component 114 (if one is present), provide for a heterogeneous polarity distribution of the light that is incident on the output-coupler 116 (after having traveled through the waveguide 100), and provide for a substantially uniform pupil distribution, and thereby, such embodiments can be used to provide a substantially uniform intensity distribution in the light that has exited the waveguide 100 at the output-coupler 116.

Another one of the benefits of the double-side DOEs is that they should provide for a better system efficiency compared to a single-sided DOE system, because at least a portion of any light that is not diffracted by the first one of the pair of DOEs, upon which the light is first incident, will likely be diffracted by the second one of the pair of DOEs.

The DOEs included in or on one of the major planar surfaces 108 or 110 can be etched into one of the major planar surfaces 108 or 110 of the bulk-substrate 106, in which case each such DOE can be said to be formed "in" the bulk-substrate 106. Alternatively, each DOE (e.g., which can be an SRG) can be physically formed in a coating that covers one of the major planar surfaces 108 or 110 of the bulk-substrate 106, in which case each such DOE can be said to be formed "on" the bulk-substrate 106. Such a coating can be isotropic, or alternatively, can be an LCP coating that is anisotropic, the benefits of which were discussed above. For example, for each double-sided DOE, one or both of the DOEs can be an LCP based SRG.

The DOEs formed in or on one of the major planar surface 108 or 110 can be formed in the same, or in a different manner, than the DOEs formed in or on the other one of the major planar surfaces 108. Either way, the components 112a-b, 114a-b and 116a-b are considered parts of the waveguide 900.

In certain embodiments, where the components 112a, 114a and 116a are DOEs that are formed in a coating covering the major planar surface 110, and the components 112b, 114b and 116b are DOEs that are formed in a coating covering the other major planar surface 108, the coatings covering the opposing major planar surfaces 110 and 108 can be of the same or different types of coating materials, and can be of the same or different thicknesses.

Each of an input-coupler, an intermediate-component and an output-coupler of a waveguide can be implemented as a double-side DOE. Alternatively, one or more of an input-coupler, an intermediate-component or an output-coupler of a waveguide can be implemented as a double-side DOE, while other one(s) of the components are not. It is also possible that one or more of an input-coupler or an output-coupler be implemented as a double-side DOE, and that the waveguide not include an intermediate-component at all.

Switchable Liquid Crystal Layer

In accordance with certain embodiments of the present technology, a waveguide includes switchable liquid crystal (LC) layer that can be used to improve the local non-uniformity for light exiting the waveguide at an output-coupler. In certain such embodiments, patterns in the LC layer can be selectively turned on or off at different points in the eye box, as discussed in further detail below. The switchable (LC) layer is an example of a volume layer that can be embedded within a bulk-substrate to cause the light that is output from a waveguide by an output-coupler to have a more uniform intensity distribution compared to if the volume layer were absent.

Figure 10:
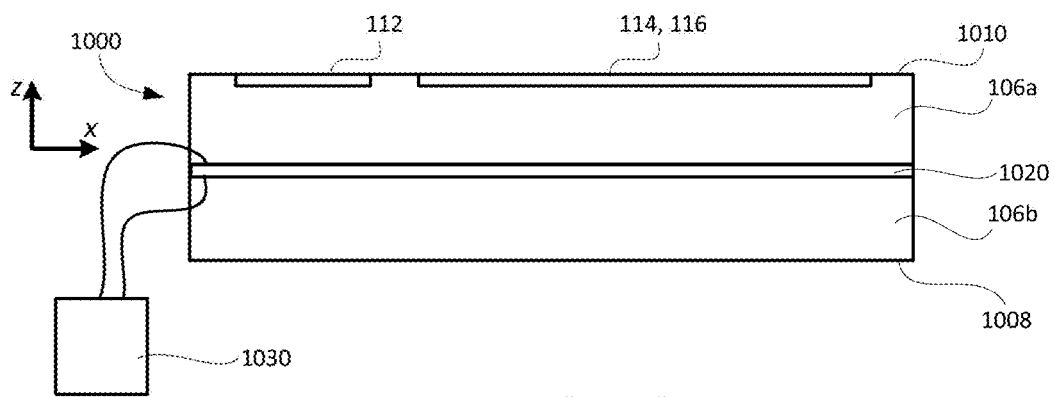
FIG. 10 is a top view of a waveguide that includes a switchable liquid crystal (LC) layer embedded in the waveguide to improve the uniformity in the intensity of light that exits the waveguide, in accordance with certain embodiments of the present technology.

An example of such an embodiment will now be described with reference to FIG. 10, which is a top view of a waveguide 1000 that includes a switchable liquid crystal (LC) layer 1020 embedded between major planar surfaces 1010 and 1008 of the waveguide 1000. More specifically, the switchable LC layer 1020 is sandwiched between a pair of bulk-substrates 106a and 106b. Each of the bulk-substrates 106a, 106b can be made of the same bulk material and can have the same index of refraction. Alternatively, the bulk-substrates 106a, 106b can be made different materials than one another and can have the different indices of refraction than one another, which can provide for the benefits discussed above with reference to FIG. 8. For simplicity, unless stated otherwise, when discussing FIG. 10 it will be assumed that the bulk-substrates 106a and 106b are made of the same material and have the same index of refraction. The thicknesses of the bulk-substrates 106a, 106b can be the same as, or different than, one another. For simplicity, unless stated otherwise, it will be assumed that the thicknesses of the bulk-substrates 106a and 106b are the same.

In certain embodiments, transparent electrodes, the shapes and sizes of which define the shapes and sizes of the liquid crystal pixels that can be produced using the switchable LC layer 1020, can be patterned on both sides of the switchable LC layer 1020, e.g., on or adjacent to the inner surfaces of the bulk-substrates 106a and 106b. Alternatively, transparent electrodes can be interdigitated electrodes that are patterned on or adjacent to only one side of the switchable LC layer 1020, e.g., on or adjacent the inner surface of only one of the bulk-substrates 106a and 106b. Such transparent electrodes can be made, e.g., of indium tin oxide (ITO), but are not limited thereto. In certain embodiments where the transparent interdigitated electrodes are patterned on or adjacent to only one side of the switchable LC layer 1020, the switchable LC layer can be a twisted nematic (TN) LC layer including an alignment component (e.g., an alignment sub-layer) to orient either the top or bottom of LC molecules.

Selectively application of an electric field, e.g., induced by applying a voltage between pairs of electrodes (which can be opposing or interdigitated) can be used to selectively turn on and off specific liquid crystal pixels, which can also be referred to more succinctly as pixels. Such electrodes can be controlled, e.g., by a controller 1030 of the system in which the waveguide 1000 is include, which as noted above, can be an imaging system such as an HMD, NED, or HUD system, but is not limited thereto. Such a controller 1030 can be implemented by a microcontroller, a microprocessor, or an application specific integrated circuit (ASIC), or discrete circuitry, but is not limited thereto.

In accordance with specific embodiments of the present technology, the electrodes could be individually addressed (i.e., individual turned on or off) to change the optical properties (e.g., the index of refraction) in the switchable LC layer 1020 and thereby change the optical properties of the waveguide at various different locations of an eye box.

The LC layer 1020 can act as a reflective surface within the waveguide 1000, wherever the index of refraction of the LC layer 1020 differs from that of the surrounding bulk-substrates 106a and 106b. For example, wherein light that is traveling through the bulk-substrate 106a is incident on the boundary (between the bulk-substrates 106a and the LC layer 1020), a portion of the light incident on the boundary (as dependent on the indexes of refraction of the two mediums meeting at the boundary, and the angle of incidence) can reflect back into the bulk-substrate 106a through TIR, while another portion of the light refracts into the LC layer 1020, undergoes a certain degree of retardation (i.e., polarization rotation) and enters the other bulk-substrate 106b to continue TIR in the waveguide 1000. This introduction of retardation will change the polarization state of the light passing through the waveguide and help overcome pupil replication non-uniformity issues, which were described above with reference to FIG. 5A.

In certain embodiments, each of the liquid crystal pixels, which are individually addressable by the controller 1030, can either be turned off or on, e.g., by applying either no voltage or a predetermined non-zero voltage between pairs of electrodes associated with the pixel. In other embodiments, liquid crystal pixels can be tuned on to varying degrees, such that there are more states (i.e., three or more) than merely fully off or fully on. In such latter embodiments, individual pixels or groups of pixels can be calibrated by tuning the pixels to the right levels depending on their use. For example, a calibration can be performed to optimize some measure of image quality, such as uniformity in intensity. Other variations are also possible, and within the embodiments of the present technology.

In the embodiments where the waveguide 1000 includes a switchable LC layer 1020, the size of the liquid crystal pixels should be large enough such that the pixels, when turned on, do not act as a diffraction grating. This should be ensured by making the pixel sizes, in both the horizontal and vertical directions (i.e., in directions that are parallel to the major planar surfaces), at least one-thousand times (i.e., 1000×) the wavelength of the light for which the waveguide 1000 is being used as an optical transmission medium. For example, for red light having a wavelength of 620 nm, the size of the pixels should be at least 630 µm. In certain embodiments, the pixels are each at least 1000 µm (i.e., at least 1 mm) in both the horizontal and vertical directions, which should ensure that they do not operate as a diffraction grating, although minor edge or aperture diffractions may be unavoidable. More generally, the size of each of substantially all (i.e., at least 90%) of the pixels, in both horizontal and vertical directions that are parallel to the first and second major planar surfaces of the bulk-substrate of planar optical waveguide, is least one-thousand times the wavelength of the light for which the waveguide is being used as an optical transmission medium.

Electrodes that define pixels can be patterned to coincide with any one, two or all of the input-coupler 112, the intermediate-component 114 or the output-coupler 116. The shapes and patterns of the electrodes can be the same for each of the components 112, 114 and 116, or can be different for separate ones of the components 112, 114 and 116.

In embodiments, such as the ones described with reference to FIG. 10, where there are two bulk-substrates (e.g., 106a and 106b) with another optical component (e.g., the switchable LC layer 1020) embedded therebetween, the two bulk-substrates (e.g., 106a and 106b) can be collectively referred to as a bulk-substrate having an embedded optical component embedded therein, or more specifically, embedded between the major planar surfaces of the bulk-substrate. In accordance with certain embodiments, liquid crystal pixels can be temporally adjusted (e.g., dithered) to provide for different optical path lengths across various pixels over time. The temporally adjusted (e.g., dithered) liquid pixels can be used to provide increased optical path length diversity, increased phase diversity, and increased polarization diversity, to thereby provide additional improvements in the uniform intensity distribution. In such embodiments, the switching speeds may be on the order of about 2 to 4 microseconds, in which case the LC layer 1020 should include fast switching liquid crystals.

In certain embodiments, where the system that includes the waveguide 1000 also includes an eye tracking subsystem that provides eye tracking capabilities, certain liquid crystal pixels can be turned on or off (totally, or to varying degrees) in dependence on gaze positions and/or gaze angles as determined using the eye tracking subsystem. For example, a calibration can be performed to determine which pixels to turn on (and to what extent the pixels should be turned on) to optimize some measure of image quality (such as uniformity in intensity) for various different gaze positions and/or gaze angles. For a more specific example, information can be stored in a table or other manners within the controller 1030, or a data store (e.g., memory) associated therewith, that specifies which pixels to turn on (and to what extent the pixels should be turned on) in dependence on different gaze positions and/or gaze angles. The eye tracking subsystem can provide, to the controller 1030, gaze positions and/or gaze angles in real-time, thereby enabling the controller 1030 to determine, in real-time, which pixels to turn on (and to what extent the pixels should be turned on) and off. Other variations are also possible, and with the scope of embodiments described herein.

Hybrid SRG-VBG Gratings

In accordance with certain embodiments of the present technology, a waveguide includes one or more hybrid gratings can be used to provide for substantially uniform local and global intensity distributions in light exiting the waveguide at an output-coupler. More specifically, such a hybrid grating can include by an SRG and a volume Bragg grating (VBG), and thus, can be referred to as a hybrid SRG-VBG grating. A VBG is a transparent grating with a periodic variation of the refractive index, so that a high diffraction efficiency may be reached in some wavelength range (bandwidth) around a certain wavelength which fulfills what is known as the Bragg condition. The VBG(s) can be included in or as a volume layer that can be embedded within a bulk-substrate to cause the light that is output from a waveguide by an output-coupler to have a more uniform intensity distribution compared to if the volume layer were absent.

Figure 11:
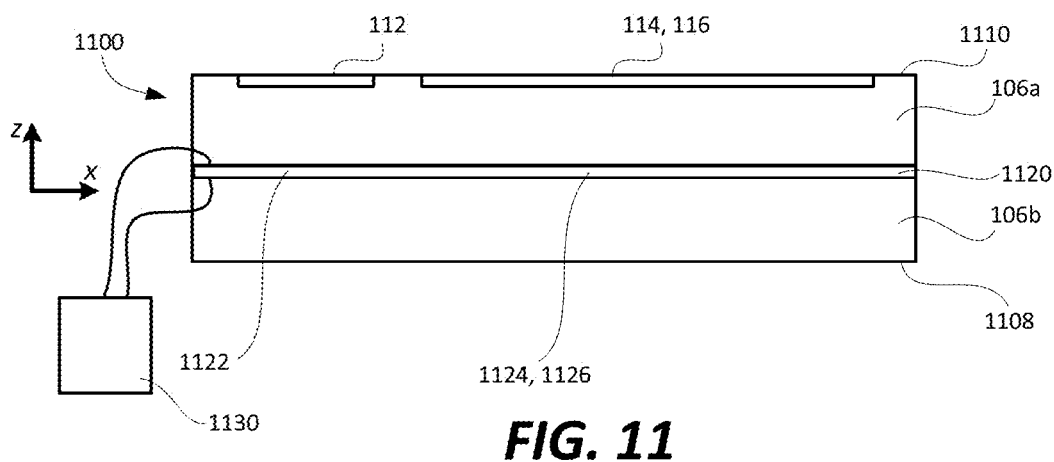
FIG. 11 is a top view of a waveguide that includes hybrid gratings, each of which is a hybrid of a surface relief grating (SRG) and a corresponding volume Bragg grating (VBG), which are used to improve the uniformity in the intensity of light that exits the waveguide, in accordance with certain embodiments of the present technology.

An example of such an embodiment will now be described with reference to FIG. 11, which is a top view of a waveguide 1100 that includes a VBG layer 1120 embedded between major planar surfaces 1110 and 1108 of the waveguide 1100. More specifically, the VBG layer 1020 is sandwiched between a pair of bulk-substrates 106a and 106b. Each of the bulk-substrates 106a, 106b can be made of the same bulk material and can have the same index of refraction. Alternatively, the bulk-substrates 106a, 106b can be made different materials than one another and can have the different indexes of refraction than one another, which can provide for the benefits discussed above with reference to FIG. 8. For simplicity, unless stated otherwise, when discussing FIG. 11 it will be assumed that the bulk-substrates 106a and 106b are made of the same material and have the same index of refraction. The thicknesses of the bulk-substrates 106a, 106b can be the same as, or different than, one another. For simplicity, unless stated otherwise, it will be assumed that the thicknesses of the bulk-substrates 106a and 106b are the same.

In certain embodiments, such as the ones described with reference to FIG. 11, where there are two bulk-substrates (e.g., 106a and 106b) with other optical components (e.g., VBGs) embedded therebetween, the two bulk-substrates (e.g., 106a and 106b) can be collectively referred to as a bulk-substrate having an embedded optical component embedded therein, or more specifically, embedded between the major planar surfaces of the bulk-substrate.

In certain embodiments, in which the waveguide 1100 includes a VBG layer 1120 embedded between the major planar surfaces 1110 and 1108 of the waveguide 1100, each of the components 112, 114 and 116 is implemented as an SRG. In such embodiments, various different VBGs can be formed within the VBG layer 1020, such that a separate VBG corresponds to any one, two or all of the input-coupler 112, the intermediate-component 114 and/or the output-coupler 116. For example, a first VBG 1122 can be congruent with and completely overlap with the input-coupler 112, a second VBG 1124 can be congruent with and completely overlap with the intermediate-component 114, and a third VBG 1126 can be congruent with and completely overlap with the output-coupler 116. Where this is the case, the input-coupler 112 and the first VBG 1122 can be collectively referred to as an SRG-VBG hybrid input-grating, the intermediate-component 114 and the second VBG 1124 can be collectively referred to as an SRG-VBG hybrid intermediate-grating, and the output-coupler 116 and the third VBG 1126 can be collectively referred to as an SRG-VBG hybrid output-grating. More generally, such pairs can be referred to as SRG-VBG hybrid gratings. In such embodiments, the first, second and third VBGs 1122, 1124 and 1126 can also be referred, respectively, as an input-VBG 1122, an intermediate-VBG 1124 and an output-VBG 1126.

In accordance with certain embodiments, the grating period and orientation of the SRG and the corresponding VBG, of an SRG-VBG hybrid grating, are precisely matched to one another so as to not adversely affect the modulation transfer function (MTF) of the imaging system and/or produce double imaging. For example, for the SRG-VBG hybrid input-grating, the grating period and orientation of the input-VBG 1122 are precisely matched to (i.e., the same as) the grating period and orientation of the SRG input-coupler 112. Similarly for the SRG-VBG hybrid intermediate-grating, the grating period and orientation of the intermediate-VBG 1124 are precisely matched to the grating period and orientation of the SRG intermediate-component 114; and for the SRG-VBG hybrid output-grating, the grating period and orientation of the output-VBG 1126 are precisely matched to the grating period and orientation of the SRG output-coupler 116.

For any individual SRG-VBG hybrid grating, the SRG and the VBG can both be transmissive gratings, can both be reflective gratings, or one can be a transmissive grating while the other is a transmissive grating.

Each VBG can be a diffractive device formed by recording a volume phase grating, or hologram, in a polymer dispersed liquid crystal (PDLC) mixture. Referring to FIG. 11, each VBG can be fabricated, e.g., by first placing a mixture of photopolymerizable monomers and liquid crystal material between opposing parallel inner planar surfaces of the bulk-substrates 106a and 106b. A VBG can then be recorded by illuminating the liquid material with two mutually coherent laser beams, which interfere to form the desired grating structure. During the recording process, the monomers polymerize and the PDLC mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting VBG can exhibit very high diffraction efficiency.

In certain embodiments the VBGs can be switchable Bragg gratings (SBGs), in which case one or both of the inner planar surfaces of the bulk-substrates 106a and 106b can support transparent electrodes for applying an electric field across the PDLC layer. In such embodiments, when an electric field is applied to the SBG via transparent electrodes, the natural orientation of the LC droplets is changed causing the refractive index modulation of the fringes to reduce and the hologram diffraction efficiency to drop to very low levels. Note that the diffraction efficiency of the device can be adjusted, by means of the applied electric field (e.g., a voltage), over a continuous range from near 100% efficiency with no voltage applied to essentially zero efficiency with a sufficiently high voltage applied. Such electrodes can be controlled, e.g., by a controller 1130 of the system in which the waveguide 1100 is include, which as noted above, can be an imaging system such as an HMD, NED, or HUD system, but is not limited thereto. Such a controller 1130 can be implemented by a microcontroller, a microprocessor, or an application specific integrated circuit (ASIC), or discrete circuitry, but is not limited thereto. The controller 1130 need not be included where the VBGs are not switchable.

As noted above, the bulk-substrates 106a, 106b, between which the VBGs are embedded, can have the same indexes of refraction, or alternatively, can be made different materials than one another and can have the different indexes of refraction than one another. This latter case would essentially combine the SRG-VBG hybrid grating embodiments, described with reference to FIG. 11, with the mismatched index of refraction embodiments described above with reference to FIG. 8.

If the components 112, 114 and 116 were each implemented as only an SRG, then polarization and phase changes are only introduced in light propagating through the bulk-substrate when the light interacts with the SRG. With the SRG-VBG hybrid gratings, twice the number of diffractive interactions are induced, wherein each interaction with a grating induces phase and polarization changes, thereby homogenizing the output distribution.

More specifically, the use of SRG-VBG hybrid gratings will increase the phase diversity of the wave fronts of light traveling within the waveguide, since light that is not diffracted by an SRG (of a hybrid grating) but is diffracted by a VBG (of the hybrid grating), or vice versa, will have traveled a greater path length (e.g., for having traveled through the thickness of the bulk-substrate 106a) before being incident on the VBG. Further, where every diffraction and/or reflection from a grating causes a phase rotation, the inclusion of both SRGs and VBGs will induce twice the number of polarization rotations, which will provide for a heterogeneous polarization distribution. Accordingly, the inclusion of SRG-VBG hybrid gratings can be used to compensate for multiple-loop interference caused by the intermediate-component 114 (if one is present), provide for a heterogeneous polarity distribution of the light that is incident on the output-coupler 116 (after having traveled through the waveguide 100), and provide for a substantially uniform pupil distribution, and thereby, such embodiments can be used to provide a substantially uniform intensity distribution in the light that has exited the waveguide 100 at the output-coupler 116.

Another one of the benefits of the SRG-VBG hybrid gratings is that they should provide for a better diffractive efficiency compared to SRGs alone, because at least a portion of any light that is not diffracted by the an SRG, upon which the light is first incident, will likely be diffracted by the corresponding VBG, or vice versa.

Another advantage of using VBGs is that the angular bandwidth can be highly tuned to a set of input angles, to further improve that intensity uniformity, e.g., by tuning the VBGs to angles that are not diffracted efficiently by the corresponding SRG.

Figure 12:
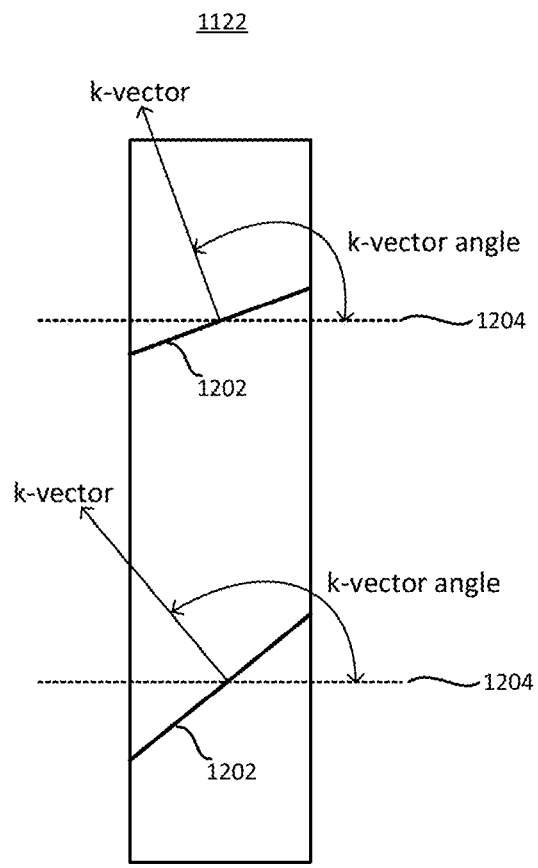
FIG. 12 illustrates exemplary k-vectors and corresponding exemplary K-vector angels of a diffraction grating of an input-coupler of a waveguide.

K-vectors of a diffraction grating, such as a VGB, are, by definition, normal to (i.e., perpendicular to) the fringe planes of the diffraction grating. The term k-vector angle, as used herein, refers to the angle of a k-vector relative to the surface normal of the diffraction grating. In other words, while each k-vector is perpendicular to a respective fringe plane, each k-vector can have a different k-vector angle relative to the surface normal of the diffraction grating. In accordance with certain embodiments, the input-VBG 1122 of has a rolled k-vector, which gradually varies between boundaries of the input-VBG 1122, in order to improve the diffraction efficiency of the input-VBG 1122. For example, referring to FIG. 12, shown therein are two exemplary fringe planes 1202 of numerous fringe planes, the others of which are not shown. Such fringe planes 1202, which can also referred to as fringes, grating planes or Bragg planes, define a grating periodicity (Λ). Also shown in FIG. 12 are dashed lines 1204 which are normal to the surface of the diffraction grating. Two k-vectors are also shown, each of which is perpendicular to a respective fringe plane 1202, and each of which has a different k-vector angle relative to the surface normal of the diffraction grating. Alternatively, the k-vectors could include two or more distinct k-vectors for different parts of the input-VBG 1122, which are used to optimize an angular bandwidth to the center of the field of view of the display. In this embodiment, it would be advantageous for the input-VBG to have two distinct k-vectors that improve the diffraction efficiency at the extremes of the field of view of the display to improve the global non-uniformity of the system.

It should be understood that a Switchable Volume Bragg Grating can be pixelated and switched on partially so as to optimize the diffraction efficiency across the grating surface. This can be used in-conjunction with an eye tracker to optimize the diffraction efficiency profile for a particular eye location. In addition, if the SBG is fast enough, it can be temporally dithered to improve the luminance uniformity over a pixel switching time.

Various embodiments of the present technology, which were described above, can be utilized in various different combinations. For example, an LCP coating 106 can be added to a waveguide that includes one or more SRG-VBG hybrid gratings. For another example, as was already described above, a waveguide that includes one or more SRG-VBG hybrid gratings can also include an adjacent planar optical-component that has a mismatched index of refraction relative to a bulk-substrate on or in which SRGs are provided. For a further example, a waveguide can include LCP based SRG(s) in or on one of its major planar surfaces, and can include an LCP coating (without grating included therein) on its other major planar surface. For still another example, where a waveguide includes one or more SRG-VBG hybrid gratings, the SRG(s), of one or more of the hybrid gratings, can be LCP based SRG(s). These are just a few exemplary ways in which embodiments of the present technology described herein can be combined, which is not intended to be all encompassing.

Certain embodiments described herein relate to an apparatus for use in replicating an image associated with an input-pupil to an output-pupil. Such an apparatus can include a planar optical waveguide including a bulk-substrate, and also including an input-coupler, an intermediate-component and an output-coupler any one of which is either formed in, on or embedded within the bulk-substrate. In certain embodiments, the input-coupler is configured to couple light corresponding to the image associated with the input-pupil into the bulk-substrate of the waveguide and towards the intermediate-component, the intermediate-component is configured to perform one of horizontal or vertical pupil expansion and to direct the light corresponding to the image towards the output-coupler, and the output-coupler is configured to perform the other one of horizontal or vertical pupil expansion and to couple the light corresponding to the image, which travels in the planar optical waveguide from the input-coupler to the output-coupler, out of the waveguide so that the light is output and imaged from the output-pupil. The bulk-substrate can include a first major planar surface and a second major planar surface opposite and parallel to the first major planar surface. In certain embodiments the intermediate-component is not included.

In certain embodiments an adjacent planar optical component is adjacent to one of the first and second major planar surfaces of the bulk-substrate and is configured to cause the light that is output from the waveguide by the output-coupler to have a more uniform intensity distribution compared to if the adjacent planar optical component were absent. In certain embodiments the adjacent planar optical component comprises at least one of a liquid crystal polymer (LCP) coating or substrate, or a coating or substrate that has an index of refraction that is different than an index of refraction of the bulk-substrate.

In certain embodiments, a portion of the light traveling from the input-coupler to the output-coupler travels by way of TIR only within the bulk-substrate, and a further portion of the light traveling from the input-coupler to the output-coupler travels through both the bulk-substrate and through the adjacent planar optical component. The adjacent planar optical component can be configured to mitigate adverse effects of multiple-loop interference that would be caused by the intermediate-component if the adjacent planar optical component were absent. The adjacent planar optical component can also be configured to randomize polarizations of the light traveling within the waveguide. For example, the adjacent planar optical component can be configured to randomize polarizations of the light traveling within the waveguide so that light traveling within the waveguide that is incident on the output-coupler has a substantially heterogeneous polarization distribution. In certain embodiments, the adjacent planar optical component is configured to offset phases of wave fronts of light traveling within the waveguide so that wave fronts of light that are output from the waveguide by the output-coupler have a substantially heterogeneous phase distribution. In certain embodiments, the adjacent planar optical component is configured provide a substantially uniform pupil distribution in the light traveling within the waveguide that is incident on the output-coupler.

The adjacent planar optical component can be isotropic. Alternatively, the adjacent planar optical component can be anisotropic. In certain embodiments, the adjacent planar optical component is birefringent. In certain embodiments, the adjacent planar optical component comprises an LCP coating. In specific embodiments, the adjacent planar optical component comprises a further bulk-substrate, wherein the index of refraction of the adjacent planar optical component is different than the index of refraction of the bulk-substrate. In certain embodiments, the intermediate-component is not present.

In accordance with certain embodiments, one or more of the input-coupler, the intermediate-component or the output-coupler comprises a surface relief grating (SRG) that is formed in a liquid crystal polymer (LCP) coating. In some embodiments, the LCP coating, in which the one or more of the input-coupler, the intermediate-component or the output-coupler is formed as an SRG, can cover one of the major planar surfaces of the bulk-substrate. The one or more of the input-coupler, the intermediate-component or the output-coupler that is formed as an SRG in the LCP coating can be configured to rotate a polarization of light that is incident thereon. In certain embodiments, each one of the input-coupler, the intermediate-component and the output-coupler is formed as an SRG in the LCP coating. Where the intermediate-component comprises an SRG that is formed in an LCP coating, this should mitigate adverse effects of multiple-loop interference that would be caused by the intermediate-component if the intermediate-component were an SRG formed in or on an isotropic material.

In accordance with certain embodiments, one or more of the input-coupler, the intermediate-component or the output-coupler comprises a double-sided diffractive optical element (DOE). In such embodiments, each double-sided DOE can comprise a first grating, which is formed in or on a first major planar surface of a bulk-substrate of the waveguide, and a corresponding second grating that is formed in or on a second major planar surface of the bulk-substrate. In accordance with certain embodiments, for each double-sided DOE, the grating period and orientation of the first and second gratings of the double-sided DOE, which are formed respectively in or on the first and second major planar surfaces of the bulk-substrate, are matched to one another. In certain embodiments, for each double-sided DOE, at least one of the first and second gratings of the double-sided DOE comprises a surface relief gratings (SRG). In certain embodiments, for at least one double-sided DOE, one of the first and second gratings comprises a transmissive grating, and the other comprises a reflective grating. In certain embodiments, the intermediate-component comprises a double-sided DOE, wherein the first and second gratings of the intermediate-component comprise reflective gratings. In certain embodiment, the intermediate-component is not present.

In accordance with certain embodiments, a switchable liquid crystal (LC) layer is embedded between the first and second major planar surfaces of the bulk-substrate of the waveguide, wherein the switchable LC layer is configured to cause light that is output by the output-coupler to have a more uniform intensity distribution compared to if the switchable LC layer were absent. In certain embodiments, the switchable LC layer is distinct from, and does not provide a function of any one of, an input-coupler, an intermediate-component and an output-coupler. The switchable LC layer can include first and second major planar sides, wherein at least one of the sides includes transparent electrodes patterned thereon that specify sizes of pixel that are formed when an electric field is applied between pairs of the transparent electrodes. In certain embodiments, a size of each of substantially all of the pixels, in both horizontal and vertical directions that are parallel to the first and second major planar surfaces of the bulk-substrate of planar optical waveguide, is least one-thousand times the wavelength of the light for which the waveguide is being used as an optical transmission medium. In certain embodiments, a size of each of substantially all of the pixels, in both horizontal and vertical directions that are parallel to the first and second major planar surfaces of the bulk-substrate of planar optical waveguide, is least 1 mm. In certain embodiments, the pixels are configured to not operate as a diffraction grating. An apparatus can also include a controller that is configured to selectively turn on and off individual pixels. In certain embodiments, a controller can be configured to selectively address individual pixels and selectively apply one of three or more different voltages between pairs of electrodes associated with individual pixels. The LC layer can be configured to mitigate adverse effects of multiple-loop interference that would be caused by the intermediate-component if the LC layer were absent.

In certain embodiments, one or more of the input-coupler, the intermediate-component or the output-coupler comprises a hybrid SRG-VBG grating that includes a surface relief grating (SRG) and corresponding volume Bragg grating (VBG). Each hybrid SRG-VBG grating can comprise an SRG that is formed in or on one of the first and second major planar surface of the bulk-substrate and a corresponding congruent and completely overlapping VBG that is embedded between the first and second major planar surface of the bulk-substrate. In certain embodiments, for each hybrid SRG-VBG grating, the grating period and orientation of the SRG and the corresponding VBG are matched to one another. In certain embodiments, for each individual hybrid SRG-VBG grating, the SRG and the corresponding VBG are either both transmissive gratings or both reflective gratings. In certain embodiments, for at least one hybrid SRG-VBG grating, the VBG comprises a switchable Bragg grating (SBG). Where the intermediate-component comprises a hybrid SRG-VBG grating, this should mitigate adverse effects of multiple-loop interference that would be caused by the intermediate-component if the intermediate-component only comprised an SRG.

Certain embodiments of the present technology relate to methods for use with a planar optical waveguide including a bulk-substrate having a pair of opposing major planar surfaces, and the waveguide also including an input-coupler, an intermediate-component and an output-coupler any one of which is either formed in, on or embedded within the bulk-substrate. Such a method can include producing an image, using the input-coupler to couple light corresponding to the image into the bulk-substrate of the waveguide and towards the intermediate-component, using the intermediate-component to perform one of horizontal or vertical pupil expansion and to direct the light corresponding to the image towards the output-coupler, and using the output-coupler to perform the other one of horizontal or vertical pupil expansion and to couple the light corresponding to the image, which travels in the planar optical waveguide from the input-coupler to the output-coupler, out of the waveguide. Such methods can also be used where the intermediate-component is not present.

A method can include using an adjacent planar optical component, adjacent to one of the first and second major planar surfaces of the bulk-substrate of the waveguide, to cause the light that is output from the waveguide by the output-coupler to have a more uniform intensity distribution compared to if the adjacent planar optical component were absent. In certain embodiments, the adjacent planar optical component comprises at least one of a liquid crystal polymer (LCP) coating or substrate, or a coating or substrate that has an index of refraction that is different than an index of refraction of the bulk-substrate. Uses of the adjacent planar optical component were summarized above, and thus, need not be repeated.

A method can include using one or more surface relief grating (SRG) that is formed in a liquid crystal polymer (LCP) coating to cause light that is output from the waveguide by the output-coupler to have a more uniform intensity distribution compared to if the adjacent planar optical component were absent.

A method can include using one or more double-sided diffractive optical element (DOE) to cause light that is output from the waveguide by the output-coupler to have a more uniform intensity distribution compared to if the double-sided DOE(s) were absent.

A method can include using a switchable liquid crystal (LC) layer embedded between the first and second major planar surfaces of the bulk-substrate of the waveguide to cause light that is output by the output-coupler to have a more uniform intensity distribution compared to if the switchable LC layer were absent.

A method can include using one or more hybrid SRG-VBG grating to cause light that is output from the waveguide by the output-coupler to have a more uniform intensity distribution compared to if the hybrid SRG-VBG grating(s) were absent.

Certain embodiments of the present technology relate to see-through, mixed reality display device systems. Such a system can include a display engine and a planar optical waveguide. The display engine is configured to produce an image. The planar optical waveguide can include a bulk-substrate, and can also include an input-coupler, an intermediate-component and an output-coupler any one of which is either formed in, on or embedded within the bulk-substrate. The input-coupler is configured to couple light corresponding to the image into the bulk-substrate of the waveguide and towards the intermediate-component. The intermediate-component is configured to perform one of horizontal or vertical pupil expansion and to direct the light corresponding to the image towards the output-coupler. The output-coupler is configured to perform the other one of horizontal or vertical pupil expansion and to couple the light corresponding to the image, which travels in the planar optical waveguide from the input-coupler to the output-coupler, out of the waveguide. In certain embodiments the intermediate-component is not included. Further exemplary details of the input-coupler, intermediate-component and the output-coupler were provided above, and thus need not be repeated.

In such systems, any one or more of the various techniques for causing the light that is output from the waveguide by the output-coupler to have a more uniform intensity distribution can be used. For example, in certain embodiments the adjacent planar optical component comprises at least one of a liquid crystal polymer (LCP) coating or substrate, or a coating or substrate that has an index of refraction that is different than an index of refraction of the bulk-substrate. As noted above, such an adjacent planar optical component can be configured to mitigate adverse effects of multiple-loop interference that would be caused by the intermediate-component if the adjacent planar optical component were absent, to randomize polarizations of the light traveling within the waveguide, to offset phases of wave fronts of light traveling within the waveguide so that wave fronts of light that are output from the waveguide by the output-coupler have a substantially heterogeneous phase distribution and/or to provide a substantially uniform pupil distribution in the light traveling within the waveguide that is incident on the output-coupler. In certain embodiments, one or more of the input-coupler, the intermediate-component or the output-coupler comprises a double-sided diffractive optical element (DOE). In certain embodiments, one or more of the input-coupler, the intermediate-component or the output-coupler comprises a surface relief grating (SRG) that is formed in a liquid crystal polymer (LCP) coating. In certain embodiments, a switchable liquid crystal (LC) layer is embedded between the major planar surfaces of the bulk-substrate of the waveguide to cause light that is output by the output-coupler to have a more uniform intensity distribution compared to if the switchable LC layer were absent. In certain embodiments, one or more of the input-coupler, the intermediate-component or the output-coupler comprises a hybrid SRG-VBG grating to cause light that is output from the waveguide by the output-coupler to have a more uniform intensity distribution compared to if the hybrid SRG-VBG grating(s) were absent. In certain embodiments, a volume layer is embedded between the major planar surfaces of the bulk-substrate, wherein the volume layer configured to cause light that is output by the output-coupler to have a more uniform intensity distribution compared to if the volume layer were absent. The volume layer can include a separate volume Bragg grating (VBG) corresponding to each of the input-coupler, the intermediate-coupler and the output-coupler. Each of the VBGs can comprise a switchable Bragg grating (SBG). In certain embodiments, the volume layer includes a switchable liquid crystal layer that is distinct from, and does not provide a function of any one of, an input-coupler, an intermediate-component or an output-coupler. Additional details of the various embodiments are provided above, and thus need not be repeated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for use in replicating an image associated with an input-pupil to an output-pupil, the apparatus comprising:
 a planar optical waveguide including a bulk-substrate, and also including an input-coupler, an intermediate-component and an output-coupler;
 the input-coupler configured to couple light corresponding to the image associated with the input-pupil into the bulk-substrate of the waveguide and towards the intermediate-component;
 the intermediate-component configured to perform one of horizontal or vertical pupil expansion and to direct the light corresponding to the image towards the output-coupler;
 the output-coupler configured to perform the other one of horizontal or vertical pupil expansion and to couple the light corresponding to the image, which travels in the planar optical waveguide from the input-coupler to the output-coupler, out of the waveguide so that the light is output and imaged from the output-pupil;
 the bulk-substrate including a first major planar surface and a second major planar surface opposite and parallel to the first major planar surface; and a switchable liquid crystal (LC) layer, embedded between the first and second major planar surfaces, configured to cause light that is output by the output-coupler to have a more uniform intensity distribution compared to if the switchable LC layer were absent.

2. The apparatus of claim 1, wherein the switchable LC layer is distinct from, and does not provide a function of any one of, the input-coupler, the intermediate-component and the output-coupler.

3. The apparatus of claim 1, wherein the switchable LC layer includes first and second major planar sides at least one of which includes transparent electrodes patterned thereon that specify sizes of pixel that are formed when an electric field is applied between pairs of the transparent electrodes.

4. The apparatus of claim 3, wherein a size of each of substantially all of the pixels, in both horizontal and vertical directions that are parallel to the first and second major planar surfaces of the bulk-substrate of planar optical waveguide, is least one-thousand times the wavelength of the light for which the waveguide is being used as an optical transmission medium.

5. The apparatus of claim 3, wherein a size of each of substantially all of the pixels, in both horizontal and vertical directions that are parallel to the first and second major planar surfaces of the bulk-substrate of planar optical waveguide, is least 1 mm.

6. The apparatus of claim 3, the pixels are configured to not operate as a diffraction grating.

7. The apparatus of claim 1, further comprising a controller that is configured to selectively turn on and off individual pixels.

8. The apparatus of claim 1, further comprising a controller that is configured to selectively address individual pixels and selectively apply one of three or more different voltages between pairs of electrodes associated with individual pixels.

9. The apparatus of claim 1, wherein the LC layer is configured to mitigate adverse effects of multiple-loop interference that would be caused by the intermediate-component if the LC layer were absent.

10. A see-through, mixed reality display device system, comprising:

a display engine configured to produce an image; and
a planar optical waveguide including a bulk-substrate, and also including an input-coupler, an intermediate-component and an output-coupler;
the input-coupler, the intermediate-component and the output-coupler comprising surface relief gratings (SRGs);
the input-coupler configured to couple light corresponding to the image into the bulk-substrate of the waveguide and towards the intermediate-component;
the intermediate-component configured to perform one of horizontal or vertical pupil expansion and to direct the light corresponding to the image towards the output-coupler;
the output-coupler configured to perform the other one of horizontal or vertical pupil expansion and to couple the light corresponding to the image, which travels in the planar optical waveguide from the input-coupler to the output-coupler, out of the waveguide;
the bulk-substrate includes a first major planar surface and a second major planar surface opposite and parallel to the first major planar surface; and
further comprising a volume layer embedded between the first and second major planar surfaces of the bulk-substrate, the volume layer configured to cause light that is output by the output-coupler to have a more uniform intensity distribution compared to if the volume layer were absent.

11. The system of claim 10, wherein the volume layer includes a separate volume Bragg grating (VBG) corresponding to each of the input-coupler, the intermediate-coupler and the output-coupler.

12. The system of claim 11, wherein each of the VBGs comprises a switchable Bragg grating (SBG).

13. The system of claim 10, wherein the volume layer includes a switchable liquid crystal layer that is distinct from, and does not provide a function of any one of, the input-coupler, the intermediate-component or the output-coupler.

* * * * *